United States Patent
Chen et al.

(10) Patent No.: US 12,411,713 B2
(45) Date of Patent: Sep. 9, 2025

(54) METHOD FOR OPTIMIZING RESOURCE ALLOCATION BASED ON PREDICTION WITH REINFORCEMENT LEARNING

(71) Applicant: ProphetStor Data Services, Inc., Taichung (TW)

(72) Inventors: Wen-Shyen Chen, Taichung (TW); Ming-Jye Sheu, Saratoga, CA (US); Henry H. Tzeng, San Jose, CA (US)

(73) Assignee: ProphetStor Data Services, Inc., Taichung (TW)

(*) Notice: Subject to any disclaimer, the term of this patent is extended or adjusted under 35 U.S.C. 154(b) by 857 days.

(21) Appl. No.: 17/678,103

(22) Filed: Feb. 23, 2022

(65) Prior Publication Data

US 2023/0267006 A1 Aug. 24, 2023

(51) Int. Cl.
*G06F 9/50* (2006.01)

(52) U.S. Cl.
CPC .................. *G06F 9/5027* (2013.01)

(58) Field of Classification Search
None
See application file for complete search history.

(56) References Cited

U.S. PATENT DOCUMENTS

| | | | |
|---|---|---|---|
| 2019/0213099 A1* | 7/2019 | Schmidt | G06N 3/044 |
| 2019/0325304 A1* | 10/2019 | Gottin | G06N 3/045 |
| 2020/0241921 A1* | 7/2020 | Calmon | G06N 3/045 |

(Continued)

FOREIGN PATENT DOCUMENTS

CN 114138416 A 3/2022

OTHER PUBLICATIONS

Y. Jiang, M. Kodialam, T. V. Lakshman, S. Mukherjee and L. Tassiulas, "Resource Allocation in Data Centers Using Fast Reinforcement Learning Algorithms," in IEEE Transactions on Network and Service Management, vol. 18, No. 4, pp. 4576-4588, Dec. 2021. (Year: 2021).*

(Continued)

*Primary Examiner* — Frank D Mills
(74) *Attorney, Agent, or Firm* — Demian K. Jackson; Jackson IPG PLLC

(57) ABSTRACT

A method for optimizing resource allocation based on prediction with reinforcement learning includes the steps of: a) providing a prediction on the number of units of the resource for a workload in more than N timepoints after a 0-th timepoint to the processor; b) calculating at least one 0-th possible operation cost (POC) based on at least one possible provisioned number (PPN) at 1-th timepoint; c) repeating the following sub-steps for the i-th timepoint with i from 1 to N by the processor: c1) calculating at least one i-th possible operation cost ($POC_i$); c2) finding out the smallest and the second smallest $POC_i$; and c3) setting $PPN_i$ used to calculate the smallest $POC_i$ as an i-th assigned number; and d) provisioning 1 unit of the resource at the 0-th timepoint and i-th assigned number of units of the resource at the i-th timepoint for the workload by the processor.

8 Claims, 19 Drawing Sheets

(56) References Cited

U.S. PATENT DOCUMENTS

2021/0255899 A1* 8/2021 Chen ................. G06N 20/00
2021/0357255 A1* 11/2021 Mahadik ............. G06F 11/3006

OTHER PUBLICATIONS

Y. Jiang, M. Kodialam, T. V. Lakshman, S. Mukherjee and L. Tassiulas, "Fast Reinforcement Learning Algorithms for Resource Allocation in Data Centers," 2020 IFIP Networking Conference (Networking), Paris, France, 2020, pp. 271-279. (Year: 2020).*
Search Report for Application No. 111108098 Mailed Dec. 7, 2022.
Taiwan Office Action for application No. 111108098 mailed Dec. 7, 2022.

* cited by examiner providing a prediction on the number of units of the resource needed for a workload in more than N timepoints after a 0-th timepoint to the processor, wherein there are maximum M units of the source available for provisioning and $U_i$ is the number of units needed at the i-th timepoint according to the prediction, and N, M and i are positive integer (S01)

calculating at least one 0-th possible operation cost ($POC_0$) based on at least one possible provisioned number (PPN) at 1-th timepoint ($PPN_1$) ranging from U1 to M by the processor, wherein the $POC_0$ is given by $POC_0 = K + RF \times | PPN_1 - K | + PPN_1$, where RF is a rebalance factor between 0 and 1, and K is a real number (S02)

repeating the following sub-steps for the i-th timepoint with i from 1 to N in sequence by the processor:
(S03-1) calculating at least one i-th possible operation cost ($POC_i$), wherein the $POC_i$ is given by
$POC_i = POC_{(i-1)} + RF \times | PPN_{(i+1)} - PPN_i | + PPN_{(i+1)}$,
where $POC_{(i-1)}$ is the possible operation cost(s) calculated for the (i-1)-th timepoint, $PPN_{(i+1)}$ is the PPN at the (i+1)-th timepoint ranging from $U_{(i+1)}$ to M, $PPN_i$ is the PPN at the i-th timepoint ranging from $U_i$ to M, and $PPN_i$s used for calculating $POC_i$ and $POC_{(i-1)}$ ave the same value;
(S03-2) finding out the smallest and the second small $POC_i$;
(S03-3) if the smallest and the second small $POC_i$ are calculated from the same $PPN_i$, then setting the $PPN_i$ used to calculate the smallest $POC_i$ as an i-th assigned number, and removing the $POC_i$(s) not calculated from the i-th assigned number for the calculation of next timepoint (S03)

provisioning 1 unit of the resource at the 0-th timepoint and i-th assigned number of units of the resource at the i-th timepoint for the workload by the processor (S04)

Calculation Table of
$RF \times |PPN_{(i+1)} - PPN_i| + PPN_{(i+1)}$

| Possible Provisioned Number at the i-th Timepoint ($PPN_i$) | Possible Provisioned Number at the (i+1)-th Timepoint ((i+1)_PPN) | | | | | |
|---|---|---|---|---|---|---|
| | 1 | 2 | 3 | 4 | 5 | 6 |
| 1 | 1 | 2.6 | 4.2 | 5.8 | 7.4 | 9 |
| 2 | 1.6 | 2 | 3.6 | 5.2 | 6.8 | 8.4 |
| 3 | 2.2 | 2.6 | 3 | 4.6 | 6.2 | 7.8 |
| 4 | 2.8 | 3.2 | 3.6 | 4 | 5.6 | 7.2 |
| 5 | 3.4 | 3.8 | 4.2 | 4.6 | 5 | 6.6 |
| 6 | 4 | 4.4 | 4.8 | 5.2 | 5.6 | 6 |

Fig. 7 providing a prediction on the number of units of the resource needed for a workload in more than N timepoints after a 0-th timepoint to the processor, wherein there are maximum M units of the source available for provisioning and $U_i$ is the number of units needed at the i-th timepoint according to the prediction, and N, M and i are positive integer (S11)

calculating at least one 0-th possible operation cost ($POC_0$) based on at least one possible provisioned number (PPN) at 1-th timepoint ($PPN_1$) ranging from $U_1$ to the largest of $U_1+A$ and M by the processor, wherein the $POC_0$ is given by
$POC_0 = K + RF \times |PPN_1 - K| + PPN_1$, where RF is a rebalance factor between 0 and 1, A is an integer, K is an integer (S12)

repeating the following sub-steps for the i-th timepoint with i from 1 to N in sequence by the processor:
(S13-1) calculating at least one i-th possible operation cost ($POC_i$), wherein the $POC_i$ is given by
$POC_i = POC_{(i-1)} + RF \times | PPN_{(i+1)} - PPNi | + PPN_{(i+1)}$,
where $POC_{(i-1)}$ is the possible operation cost(s) calculated for the (i-1)-th timepoint, $PPN_{(i+1)}$ is the PPN at the (i+1)-th timepoint ranging from $U_{(i+1)}$ to the smallest of $U_{(i+1)}+A$ and M, $PPN_i$ is the PPN at the i-th timepoint ranging from $U_i$ to the smallest of $U_i+A$ and M, and $PPN_i$s used for calculating $POC_i$ and $POC_{(i-1)}$ have the same value;
(S13-2) finding out the smallest and the second small $POC_i$;
(S13-3) if the smallest and the second small $POC_i$ are calculated from the same $PPN_i$, then setting the $PPN_i$ used to calculate the smallest $POC_i$ as an i-th assigned number, and removing the $POC_i$(s) not calculated from the i-th assigned number for the calculation of next timepoint (S13)

provisioning 1 unit of the resource at the 0-th timepoint and i-th assigned number of units of the resource at the i-th timepoint for the workload by the processor (S14)

Fig. 11 providing a prediction on the number of units of the resource needed for a workload in more than N timepoints after a 0-th timepoint to the processor, wherein there are maximum M units of the source available for provisioning and $U_i$ is the number of units needed at the i-th timepoint according to the prediction, and N, M and i are positive integer (S21)

↓ calculating at least one 1-th possible operation cost ($POC_1$) based on at least one possible provisioned number (PPN) at 1-th timepoint ($PPN_1$) ranging from $U_1$ to M and at least one PPN at 2-th timepoint ($PPN_2$) ranging from $U_2$ to M by the processor, wherein the $POC_0$ is given by
$POC_1 = K + RF \times |PPN_1 - 1| + PPN_1 + RF \times |PPN_2 - PPN_1| + PPN_2$,
where RF is a rebalance factor between 0 and 1, and K is a real number (S22)

↓ setting the $PPN_1$ used to calculate the smallest $POC_1$ as a 1-th assigned number (S23)

↓ repeating the following sub-steps for timepoints with an even number i from 2 to 2 × [N/2] in sequence by the processor:
(S23-1) calculating at least one (i+1)-th possible operation cost $POC_{(i+1)}$, wherein the $POC_{(i+1)}$ is given by
$POC_{(i+1)} = POC_{(i-1)} + RF \times | PPN_{(i+1)} - PPN_i | + PPN_{(i+1)} + Wi$,
where Wi is $RF \times | PPN_{(i+2)} - PPN_{(i+1)} | + PPN_{(i+2)}$, $POC_{(i-1)}$ is the possible operation cost(s) calculated for the (i-1)-th timepoint, $PPN_{(i+2)}$ is the PPN at the (i+2)-th timepoint ranging from $U_{(i+2)}$ to M, $PPN_{(i+1)}$ is the PPN at the (i+1)-th timepoint ranging from $U_{(i+1)}$ to M, $PPN_i$ is the PPN at the i-th timepoint ranging from $U_i$ to M, and $PPN_i$s used for calculating $POC_{(i+1)}$ and $POC_{(i-1)}$ have the same value; wherein if (i+2) is greater than N, Wi is omitted from calculation;
(S23-2finding out the smallest and the second small $POC_i$;
(S23-3) if the smallest and the second small $POC_i$ are calculated from the same $PPN_i$, then setting the $PPN_i$ used to calculate the smallest $POC_{(i+1)}$ as an i-th assigned number and the $PPN_{(i+1)}$ used to calculate the smallest $POC_{(i+1)}$ as an (i+1)-th assigned number, and removing the $POC_{(i+1)}$(s) not calculated from the i-th assigned number for the calculation of next timepoint (S24)

↓ provisioning 1 unit of the resource at the 0-th timepoint and j-th assigned number of units of the resource at the j-th timepoint for the workload by the processor where j ranges from 1 to N (S25)

Fig. 12

Calculation Table of $POC_{(i+1)} = POC_{(i-1)} + RF \times [PPN_{(i-1)} - PPN_i] + PPN_{(i+1)} + RF \times [PPN_{(i+1)} - PPN_{(i-1)}] + PPN_{(i+2)}$

| PPN at the i-th Timepoint ($PPN_i$) | PPN at the (i+1)-th Timepoint ($PPN_{(i+1)}$) = 1 | | | | | | PPN at the (i+1)-th Timepoint ($PPN_{(i+1)}$) = 2 | | | | | | PPN at the (i+1)-th Timepoint ($PPN_{(i+1)}$) = 3 | | | | | |
|---|---|---|---|---|---|---|---|---|---|---|---|---|---|---|---|---|---|---|
| | PPN at the (i-2)-th Timepoint ($PPN_{(i-2)}$) | | | | | | PPN at the (i-2)-th Timepoint ($PPN_{(i-2)}$) | | | | | | PPN at the (i-2)-th Timepoint ($PPN_{(i-2)}$) | | | | | |
| | 1 | 2 | 3 | 4 | 5 | 6 | 1 | 2 | 3 | 4 | 5 | 6 | 1 | 2 | 3 | 4 | 5 | 6 |
| 1 | 2 | 3.6 | 5.2 | 6.8 | 8.4 | 10 | 4.2 | 4.6 | 6.2 | 7.8 | 9.4 | 11 | 6.4 | 6.8 | 7.2 | 8.8 | 10.4 | 12 |
| 2 | 2.6 | 4.2 | 5.8 | 7.4 | 9 | 10.6 | 3.6 | 4 | 5.6 | 7.2 | 8.8 | 10.4 | 5.8 | 6.2 | 6.8 | 8.2 | 9.8 | 11.4 |
| 3 | 3.2 | 4.8 | 6.4 | 8 | 9.6 | 11.2 | 4.2 | 4.6 | 6.2 | 7.8 | 9.4 | 11 | 5.2 | 5.6 | 6 | 7.6 | 9.2 | 10.8 |
| 4 | 3.8 | 5.4 | 7 | 8.6 | 10.2 | 11.8 | 4.8 | 5.2 | 6.8 | 8.4 | 10 | 11.6 | 5.8 | 6.2 | 6.6 | 8.2 | 9.8 | 11.4 |
| 5 | 4.4 | 6 | 7.6 | 9.2 | 10.8 | 12.4 | 5.4 | 5.8 | 7.4 | 9 | 10.6 | 12.2 | 6.4 | 6.8 | 7.2 | 8.8 | 10.4 | 12 |
| 6 | 5 | 6.6 | 8.2 | 9.8 | 11.4 | 13 | 6 | 6.4 | 8 | 9.6 | 11.2 | 12.8 | 7 | 7.4 | 7.8 | 9.4 | 11 | 12.6 |

| PPN at the i-th Timepoint ($PPN_i$) | PPN at the (i+1)-th Timepoint ($PPN_{(i+1)}$) = 4 | | | | | | PPN at the (i+1)-th Timepoint ($PPN_{(i+1)}$) = 5 | | | | | | PPN at the (i+1)-th Timepoint ($PPN_{(i+1)}$) = 6 | | | | | |
|---|---|---|---|---|---|---|---|---|---|---|---|---|---|---|---|---|---|---|
| | PPN at the (i-2)-th Timepoint ($PPN_{(i-2)}$) | | | | | | PPN at the (i-2)-th Timepoint ($PPN_{(i-2)}$) | | | | | | PPN at the (i-2)-th Timepoint ($PPN_{(i-2)}$) | | | | | |
| | 1 | 2 | 3 | 4 | 5 | 6 | 1 | 2 | 3 | 4 | 5 | 6 | 1 | 2 | 3 | 4 | 5 | 6 |
| 1 | 8.6 | 9 | 9.4 | 9.8 | 11.4 | 13 | 10.8 | 11.2 | 11.6 | 12 | 12.4 | 14 | 13 | 13.4 | 13.8 | 14.2 | 14.6 | 15 |
| 2 | 8 | 8.4 | 8.8 | 9.2 | 10.8 | 12.4 | 10.2 | 10.6 | 11 | 11.4 | 11.8 | 13.4 | 12.4 | 12.8 | 13.2 | 13.6 | 14 | 14.4 |
| 3 | 7.4 | 7.8 | 8.2 | 8.6 | 10.2 | 11.8 | 9.6 | 10 | 10.4 | 10.8 | 11.2 | 12.8 | 11.8 | 12.2 | 12.6 | 13 | 13.4 | 13.8 |
| 4 | 6.8 | 7.2 | 7.6 | 8 | 9.6 | 11.2 | 9 | 9.4 | 9.8 | 10.2 | 10.6 | 12.2 | 11.2 | 11.6 | 12 | 12.4 | 12.8 | 13.2 |
| 5 | 7.4 | 7.8 | 8.2 | 8.6 | 10.2 | 11.8 | 8.4 | 8.8 | 9.2 | 9.6 | 10 | 11.6 | 10.6 | 11 | 11.4 | 11.8 | 12.2 | 12.6 |
| 6 | 8 | 8.4 | 8.8 | 9.2 | 10.8 | 12.4 | 9 | 9.4 | 9.8 | 10.2 | 10.6 | 12.2 | 10 | 10.4 | 10.8 | 11.2 | 11.6 | 12 |

Calculation for the 8-th and 9-th Timepoints

Calculation Table of  $RF \times |PPN_9 - PPN_8| \div PPN_9$

| PPN at the 8-th Timepoint ($PPN_8$) | PPN at the 9-th Timepoint ($PPN_9$) | | | | | |
|---|---|---|---|---|---|---|
| | 1 | 2 | 3 | 4 | 5 | 6 |
| 1 | | | | | | |
| 2 | | | | | | 8.4 |
| 3 | | | | | | 7.8 |
| 4 | | | | | | 7.2 |
| 5 | | | | | | 6.6 |
| 6 | | | | | | 6 |

Calculation Table of  $POC_9 = POC_7 + RF \times |PPN_9 - PPN_8| \div PPN_9$

| $POC_7$ | PPN at the 8-th Timepoint ($PPN_8$) | PPN at the 9-th Timepoint ($PPN_9$) | | | | | |
|---|---|---|---|---|---|---|---|
| | | 1 | 2 | 3 | 4 | 5 | 6 |
| | 1 | | | | | | |
| 34.4 | 2 | | | | | | 52.8 |
| 34.8 | 3 | | | | | | 52.6 |
| 35.2 | 4 | | | | | | 52.4 |
| 35.6 | 5 | | | | | | 52.2 |
| 37.2 | 6 | | | | | | 53.2 |

Fig. 19

METHOD FOR OPTIMIZING RESOURCE ALLOCATION BASED ON PREDICTION WITH REINFORCEMENT LEARNING

FIELD OF THE INVENTION

The present invention relates to a method for optimizing allocation. More particularly, the present invention relates to a method for optimizing allocation based on a prediction with reinforcement learning.

BACKGROUND OF THE INVENTION

In a computer cluster, hardware resources are dynamically assigned for a workload. Since resource requirements, such as RAM modules or CPUs needed to be deployed, of the workload may vary with time, there are many prediction methods to have a predicted quantity in the future. Although the construction cost of the computer cluster is fixed in general, the operation cost, including lifetime amortization and power consumption, will increase along with the change of number of the hardware resources. A significant change of the hardware (scaling) resources for the workload according to any prediction may not be economical from the perspective of total cost. Without prediction, the adjustment of the number of the hardware resources is reactive, resulting in great latency in response.

Therefore, in order to reduce the impact of the above problem, a more accurate prediction for the workload is required. Reinforcement Learning (RL) approach introduced in the past is using the learning process to explore all the possibilities in action in any time points in the future to make an optimized decision to meet the objective of some tasks or games. When the RL approach is applied to predict the workload, it leads to an all possible-paths problem. Namely, if the workload has a choice to utilize n number of a resource at one time and there are m number of time points in the future needed to be predicted, the RL approach has to consider $n^m$ paths of the deployment of the resource based on a long learning journey. Obviously, computational complexity of the decision-making process needed to calculate the optimized result is exponential. The computation cost is another trouble for the administrator because it takes more software development manpower.

From a balanced point of view, if the adjustment of the number of the hardware resources is as few as possible while the computation cost of the RL approach is limited, the total cost for the workload could be minimum. However, there is no such method disclosed by the prior arts providing said function used for the computer cluster.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

According to an aspect of the present invention, a method for optimizing resource allocation based on prediction with reinforcement learning is disclosed. It is implemented by a processor which determines the number of units of a resource in a computer cluster to be deployed. The method comprises the steps of: a) providing a prediction on the number of units of the resource needed for a workload in more than N timepoints after a 0-th timepoint to the processor, wherein there are maximum M units of the source available for provisioning and $U_i$ is the number of units needed at the i-th timepoint according to the prediction, and N, M and i are positive integer; b) calculating at least one 0-th possible operation cost ($POC_0$) based on at least one possible provisioned number (PPN) at 1-th timepoint ($PPN_1$) ranging from $U_1$ to M by the processor, wherein the $POC_0$ is given by $POC_0 = K + RF \times |PPN_1 - K| + PPN_1$, where RF is a rebalance factor between 0 and 1, and K is a real number; c) repeating the following sub-steps for the i-th timepoint with i from 1 to N in sequence by the processor: c1) calculating at least one i-th possible operation cost ($POC_i$), wherein the $POC_i$ is given by $POC_i = POC_{(i-1)} + RF \times |PPN_{(i+1)} - PPN_i| + PPN_{(i+1)}$, where $POC_{(i-1)}$ is the possible operation cost(s) calculated for the (i−1)-th timepoint, $PPN_{(i+1)}$ is the PPN at the (i+1)-th timepoint ranging from $U(i+1)$ to M, $PPN_i$ is the PPN at the i-th timepoint ranging from $U_i$ to M, and $PPN_i$s used for calculating $POC_i$ and $POC_{(i-1)}$ have the same value; c2) finding out the smallest and the second smallest $POC_i$; and c3) if the smallest and the second smallest $POC_i$ are calculated from the same $PPN_i$, then setting the $PPN_i$ used to calculate the smallest $POC_i$ as an i-th assigned number, and removing the $POC_i$(s) not calculated from the i-th assigned number for the calculation of next timepoint; and d) provisioning 1 unit of the resource at the 0-th timepoint and i-th assigned number of units of the resource at the i-th timepoint for the workload by the processor.

The method may further comprises a sub-step: c4) if the smallest and the second smallest $POC_i$ are not calculated from the same $PPN_i$, then individually using the $PPN_i$s to calculate $POC_{(i+1)}$, setting the $PPN_i$ used to calculate the smallest $POC_{(i+1)}$ as the i-th assigned number, and removing the $POC_i$(s) not calculated from the i-th assigned number for the calculation of next timepoint, wherein $POC_{(i+1)}$ is the possible operation cost(s) calculated for the (i+1)-th timepoint.

Preferably, the resource is memory module, CPU, I/O throughput, response time, request per second, or latency.

Another method for optimizing resource allocation based on prediction with reinforcement learning is also disclosed in the present invention. It is implemented by a processor which determines the number of units of a resource in a computer cluster to be deployed. The method comprises the steps of: a) providing a prediction on the number of units of the resource needed for a workload in more than N timepoints after a 0-th timepoint to the processor, wherein there are maximum M units of the source available for provisioning and $U_i$ is the number of units needed at the i-th timepoint according to the prediction, and N, M and i are positive integer; b) calculating at least one 0-th possible operation cost ($POC_0$) based on at least one possible provisioned number (PPN) at 1-th timepoint ($PPN_1$) ranging from $U_1$ to the smallest of $U_1+A$ and M by the processor, wherein the $POC_0$ is given by $POC_0 = K + RF \times |PPN_1 - K| + PPN_1$, where RF is a rebalance factor between 0 and 1, A is an integer, and K is a real number; c) repeating the following sub-steps for the i-th timepoint with i from 1 to N in sequence by the processor: c1) calculating at least one i-th possible operation cost ($POC_i$), wherein the $POC_i$ is given by $POC_i = POC_{(i-1)} + RF \times |PPN_{(i+1)} - PPN_i| + PPN_{(i+1)}$, where $POC_{(i-1)}$ is the possible operation cost(s) calculated for the (i−1)-th timepoint, $PPN_{(i+1)}$ is the PPN at the (i+1)-th timepoint ranging from $U_{(i+1)}$ to the smallest of $U_{(i+1)}+A$ and M, $PPN_i$ is the PPN at the i-th timepoint ranging from $U_i$ to the smallest of $U_1+A$ and M, and $PPN_i$s used for calculating $POC_i$ and $POC_{(i-1)}$ have the same value; c2) finding out the smallest and the second smallest $POC_i$; and c3) if the smallest and the second smallest $POC_i$ are calculated from the same $PPN_i$, then setting the $PPN_i$ used to calculate the smallest $POC_i$ as an i-th assigned number, and removing the $POC_i(s)$ not calculated from the i-th assigned number for the calculation of next timepoint; and d) provisioning 1 unit of the resource at the 0-th timepoint and i-th assigned number of units of the resource at the i-th timepoint for the workload by the processor.

The method may further comprise a sub-step: c4) if the smallest and the second smallest $POC_i$ are not calculated from the same $PPN_i$, then individually using the $PPN_i$s to calculate $POC_{(i+1)}$, setting the $PPN_i$ used to calculate the smallest $POC_{(i+1)}$ as the i-th assigned number, and removing the $POC_i(s)$ not calculated from the i-th assigned number for the calculation of next timepoint, wherein $POC_{(i+1)}$ is the possible operation cost(s) calculated for the (i+1)-th timepoint.

Preferably, the resource is memory module, CPU, I/O throughput, response time, request per second, or latency.

Still another method for optimizing resource allocation based on prediction with reinforcement learning, implemented by a processor which determines the number of units of a resource in a computer cluster to be deployed, comprising the steps of: a) providing a prediction on the number of units of the resource needed for a workload in more than N timepoints after a 0-th timepoint to the processor, wherein there are maximum M units of the source available for provisioning and $U_i$ is the number of units needed at the i-th timepoint according to the prediction, and N, M and i are positive integer; b) calculating at least one 1-th possible operation cost ($POC_1$) based on at least one possible provisioned number (PPN) at 1-th timepoint ($PPN_1$) ranging from $U_1$ to M and at least one PPN at 2-th timepoint ($PPN_2$) ranging from $U_2$ to M by the processor, wherein the $POC_0$ is given by $POC_1=K+RF\times |PPN_1-K|+PPN_1+RF\times |PPN_2-PPN_1|+PPN_2$, where RF is a rebalance factor between 0 and 1, and K is a real number; c) setting the $PPN_1$ used to calculate the smallest $POC_1$ as a 1-th assigned number; d) repeating the following sub-steps for timepoints with an even number i from 2 to 2×[N/2] in sequence by the processor: d1) calculating at least one (i+1)-th possible operation cost $POC_{(i+1)}$, wherein the $POC_{(i+1)}$ is given by $POC_{(i+1)}=POC_{(i-1)}+RF\times | PPN_{(i+1)}-PPN_i|+PPN_{(i+1)}+Wi$, where Wi is $RF\times | PPN_{(i+2)}-PPN_{(i+1)}|+PPN_{(i+2)}$, $POC_{(i-1)}$ is the possible operation cost(s) calculated for the (i−1)-th timepoint, $PPN_{(i+2)}$ is the PPN at the (i+2)-th timepoint ranging from $U_{(i+2)}$ to M, $PPN_{(i-1)}$ is the PPN at the (i+1)-th timepoint ranging from $U_{(i+1)}$ to M, $PPN_i$ is the PPN at the i-th timepoint ranging from $U_i$ to M, and $PPN_i$s used for calculating $POC_{(i+1)}$ and $POC_{(i-1)}$ have the same value; wherein if (i+2) is greater than N, Wi is omitted from calculation; d2) finding out the smallest and the second smallest $POC_i$; and d3) if the smallest and the second smallest $POC_i$ are calculated from the same $PPN_i$, then setting the $PPN_i$ used to calculate the smallest $POC_{(i+1)}$ as an i-th assigned number and the $PPN_{(i+1)}$ used to calculate the smallest $POC_{(i+1)}$ as an (i+1)-th assigned number, and removing the $POC_{(i+1)}(s)$ not calculated from the i-th assigned number for the calculation of next timepoint; and e) provisioning 1 unit of the resource at the 0-th timepoint and j-th assigned number of units of the resource at the j-th timepoint for the workload by the processor where j ranges from 1 to N.

Preferably, the resource is memory module, CPU, I/O throughput, response time, request per second, or latency.

BRIEF DESCRIPTION OF THE DRAWINGS

FIG. 1 illustrates a hardware architecture the present invention is applied to.

FIG. 2 is a flow chart of a method disclosed in a first embodiment of the present invention.

FIG. 4 is a look-up table.

FIG. 5 to FIG. 7 tabularize calculations for all timepoints.

FIG. 8 is a flow chart of an improved method disclosed in a second embodiment of the present invention.

FIG. 10 and FIG. 11 tabularize calculations for all timepoints.

FIG. 12 is a flow chart of a method disclosed in a third embodiment of the present invention.

FIG. 14 is a look-up table.

Figure 16:
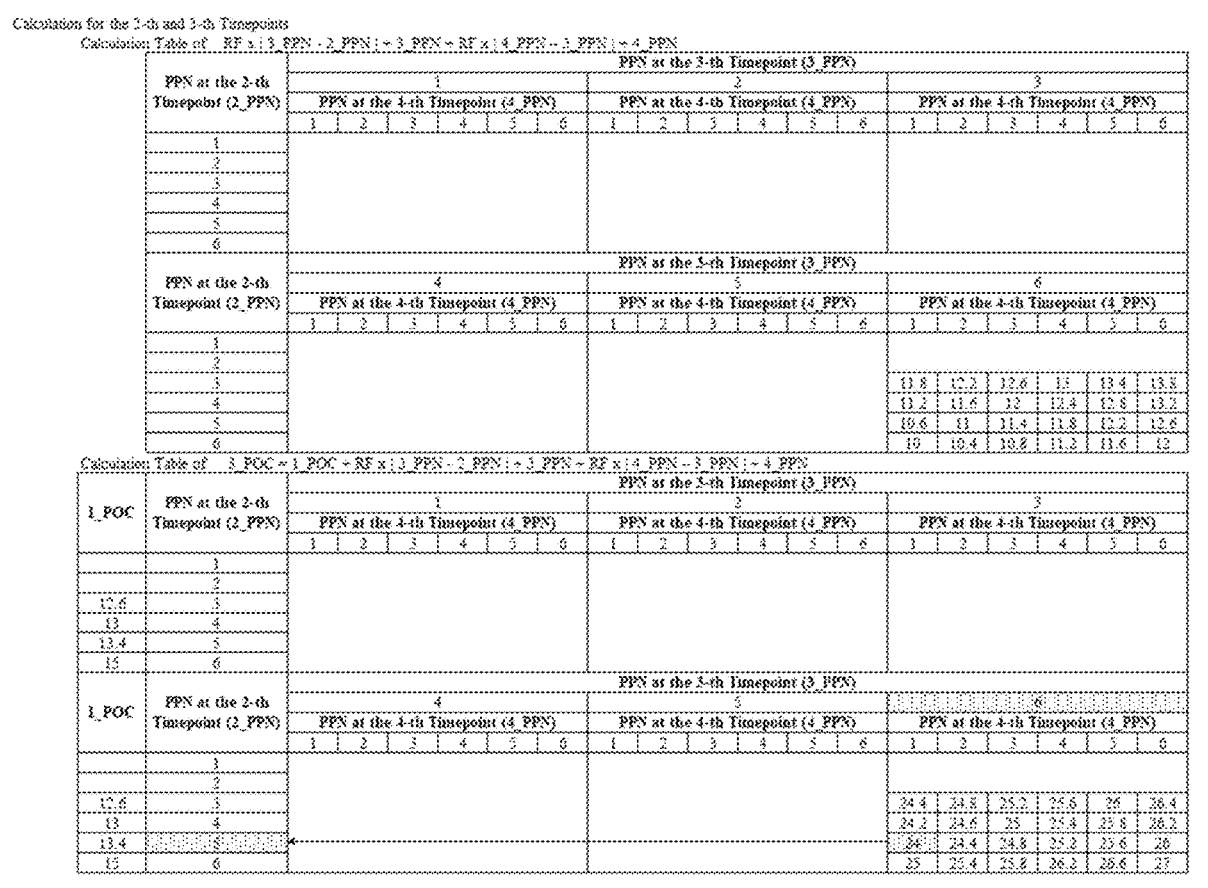

FIG. 15 to FIG. 19 tabularize calculations for all timepoints.

DETAILED DESCRIPTION OF THE PREFERRED EMBODIMENTS

The present invention will now be described more specifically with reference to the following embodiments.

Figure 1:
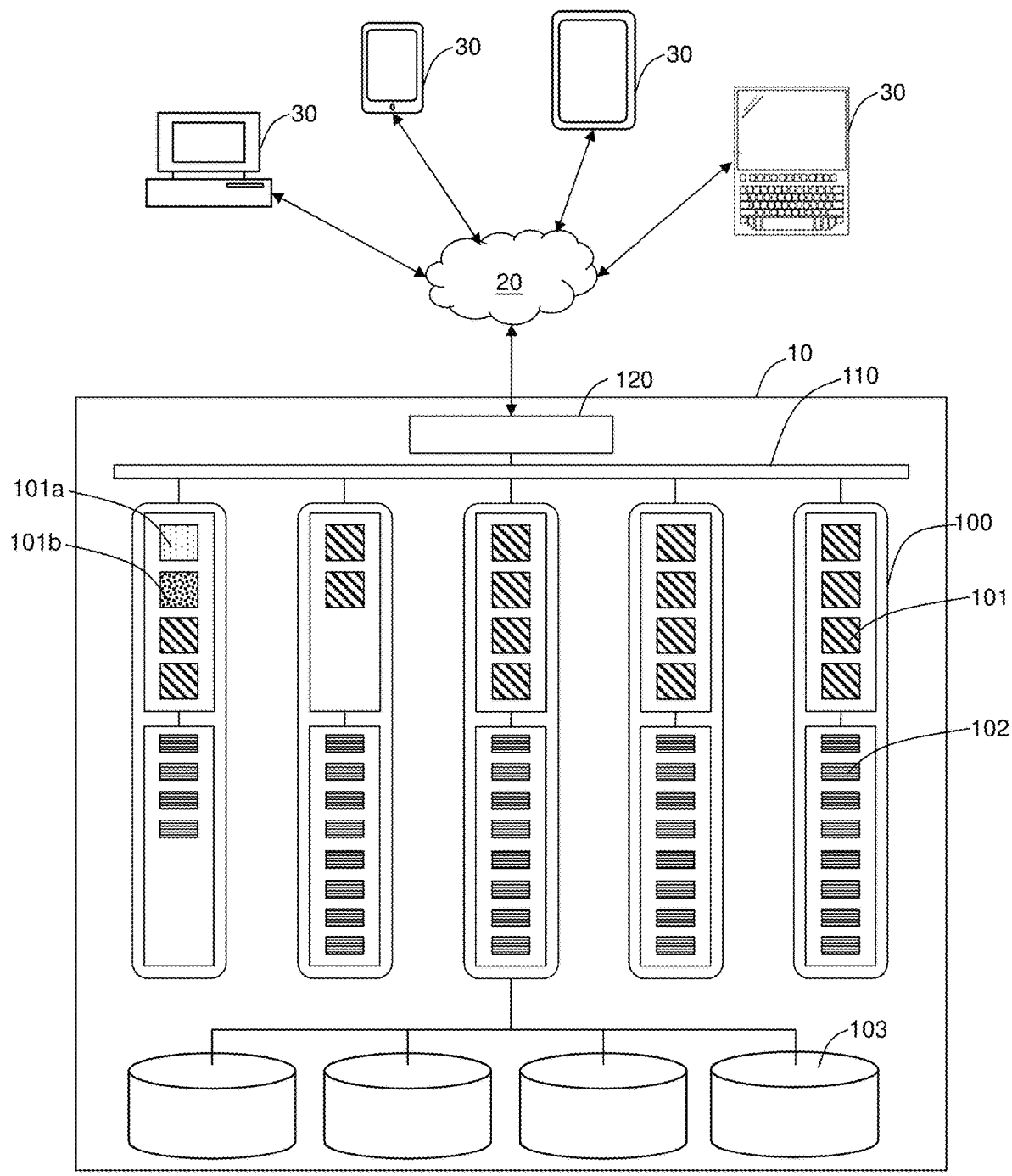

Please refer to FIG. 1. It illustrates a hardware architecture the present invention is applied to. A computer cluster 10, e.g., a data center, has many computing units 100, each would have a number of CPUs 101 and memory modules 102, such as SDRAM, and shares data stored in the storing devices 103, such as hard disk. The computing units 100 can collaborate to support operation of a workload through an internal data network 110. The computer cluster 10 further connects the user ends 30 through internet 20 via a network communication interface 120. For example, the computing units 100 provide a streaming service to the user ends 30 as a workload. The number of CPUs 101 and memory modules 102 provisioned to workload determines how fast the workload can response to the requests. CPUs and memory modules are called resources in the embodiment. Although more resources deployed to the workload enhances the performance of the workload, it also costs burden to the entire system. Lifetime of the resources is consumed and other workloads are not able to share the same resources. Therefore, the present invention is a method for optimizing resource allocation. The allocation is based on the prediction of the requirement of the resources but modified by a means of reinforcement learning. The method is implemented by a processor 101a (an application specific integrated circuit or one of the CPU 100) in one of the computing units 100. The processor 101a determines the number of units of the resources in the computer cluster 10 to be deployed and the deployment is according to the results from the method. The prediction may be calculated and provided by another CPU 101b, or input from an external system out of the computer cluster 10.

Figure 3:
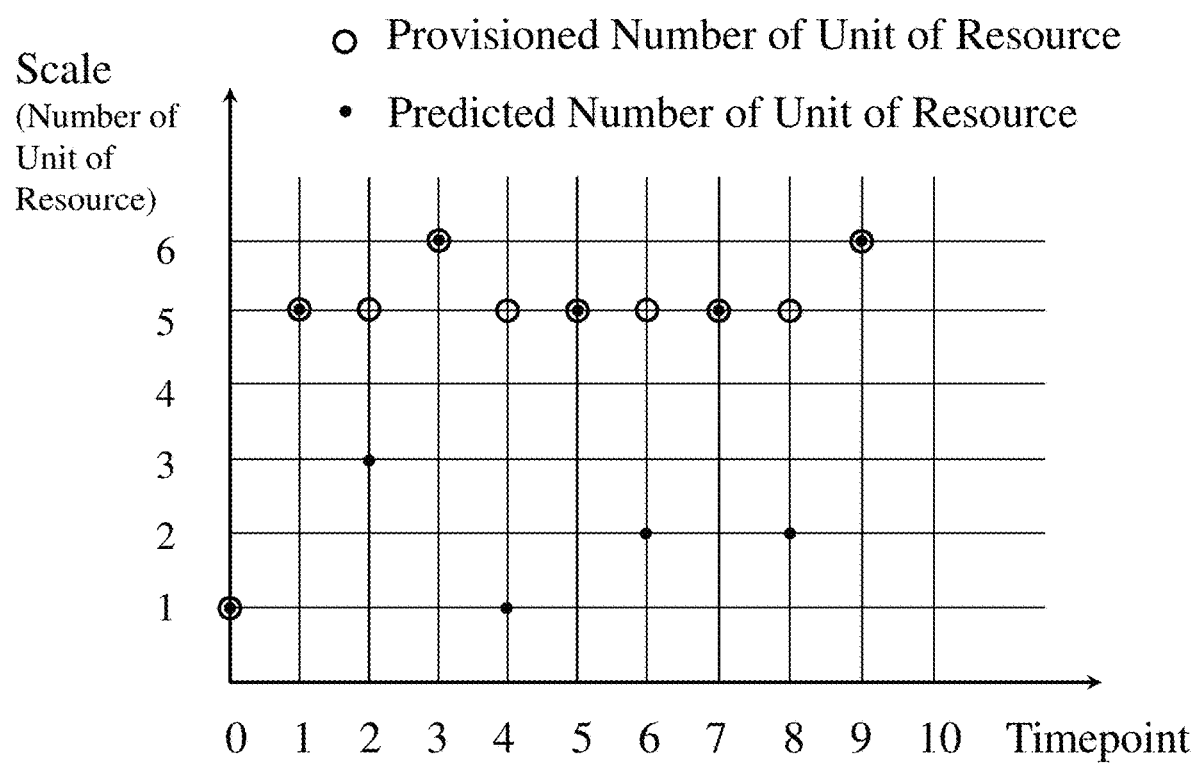
FIG. 3 shows a prediction result.

Please refer to FIG. 2. It is a flow chart of a method disclosed in a first embodiment of the present invention. A first step of the method is providing a prediction on the number of units of the resource needed for a workload in more than N timepoints after a 0-th timepoint to the processor, wherein there are maximum M units of the source available for provisioning and $U_i$ is the number of units needed at the i-th timepoint according to the prediction, and N, M and i are positive integer (S01). The prediction may be any method based on algorithm, formula, experience or even artificial intelligence, as long as the number of units of the resource needed for the workload in the future can be available. According to the present invention, not all the results from the prediction would be used for calculation. Only a limited number, N, will be used. N is a number defined by the user of the present invention. In this embodiment, N is set as 9 for reference. The prediction may provide the requirement of resources for more than N timepoints. The extra data could be applied to another stage of resource allocation calculation. In the present embodiment, 6 is taken for M as an example. In view of the values of M and N, a prediction result is shown in FIG. 3 for the operations in the next steps. Solid dots represent the predicted number of units of the resource, e.g., CPU, at different timepoints. For example, the 3-th timepoint may require 6 units of the resource according to the prediction. Broadly speaking, all the controllable operating results of the system that can improve the performance of the workload are regarded as a kind of resources, for example, but not limited to I/O throughput, response time, request per second, and latency.

A second step of the method is calculating at least one 0-th possible operation cost ($POC_0$) based on at least one possible provisioned number (PPN) at 1-th timepoint ($PPN_1$) ranging from $U_1$ to M by the processor, wherein the $POC_0$ is given by $POC_0 = K + RF \times |PPN_1 - K| + PPN_1$, where RF is a rebalance factor between 0 and 1, and K is a real number (S02). This step performs an initial calculation by the processor 101a. For a better understanding, please refer to FIG. 5. It tabularizes calculations for a portion of the timepoints. Each calculation is divided into three matrixes. The left matrix lists all PPNs in the previous timepoint. The middle matrix shows a portion of calculations on transition costs (compared with FIG. 4). The right matrix adds the POC to each of the transition cost on the same row and shows the results for finding an assigned number for the current timepoint. The basic concept of the present invention is to determine a proper number of units of the resource for one timepoint by considering operation costs accumulated from all kinds of combinations of units of the resource calculated for provisioning to the workload at the previous timepoint(s), finding out the smallest accumulated cost, and using the possible provisioned number as an assigned number for the resource to deploy to the workload. If necessary, the calculations for next timepoint would be taken into account. The whole processes are extended from the logics of reinforcement learning (dynamic programming) and uses similar concepts such as cost function, maximum reward (minimum cost), and iteration. However, in order to reduce lengthy calculation process, reasonable and unnecessary calculations are omitted. PPN refers to all numbers which are candidates for one timepoint. $PPN_i$ is any one number from a predicted number, $U_i$, to the maximum number, M, which the system can offer. For example, at 2-th timepoint, the predicted number of units of the resource needed is 3 and there are maximal 6 units of resource can be deployed, the $PPN_2$ used for calculations for the 1-th and 2-th timepoints are 3, 4, 5, and 6. If $U_i$ and M are the same, only one number is used. At any timepoint, when one unit of the resource is deployed, the action would reduce the lifetime of the resource and costs power. To simplify and quantify the results, give the usage a smallest cost, 1, as K, from the beginning for all subsequent calculations. In the description of all embodiments, K is set as 1 for illustration. Of course, the changed number of the resource between two consequent timepoints also costs but not much as the one for deployment. Hence, the rebalance factor is given to discount the change. RF varies as different kind of resource is applied. Choosing of RF is based on the characteristics of the resource. In this embodiment, 0.6 is used as an example.

For the calculation for the 0-th timepoint, it is an exception. Since there is no more previous timepoints, an initial value used as the accumulated cost should be assigned. According to the present invention, the number is "1". In the aforementioned calculation formula, "$|PPN_1 - 1|$" gets the changed number of the resource between the 0-th and 1-th timepoints, "$RF \times |PPN_1 - 1|$" discounts the $|PPN_1 - 1|$ by 40% (RF=0.6), and two $POC_0$s, 8.4 and 10, are obtained for the calculation of the 1-th timepoint. It should be emphasized that in other example, the number of $POC_0$ may be more than 2, it may be only one.

A third step of the method is repeating the following sub-steps for the i-th timepoint with i from 1 to N in sequence by the processor (S03). This step is the calculations for all N timepoints. The sub-steps are illustrated in detail below.

Figure 5:
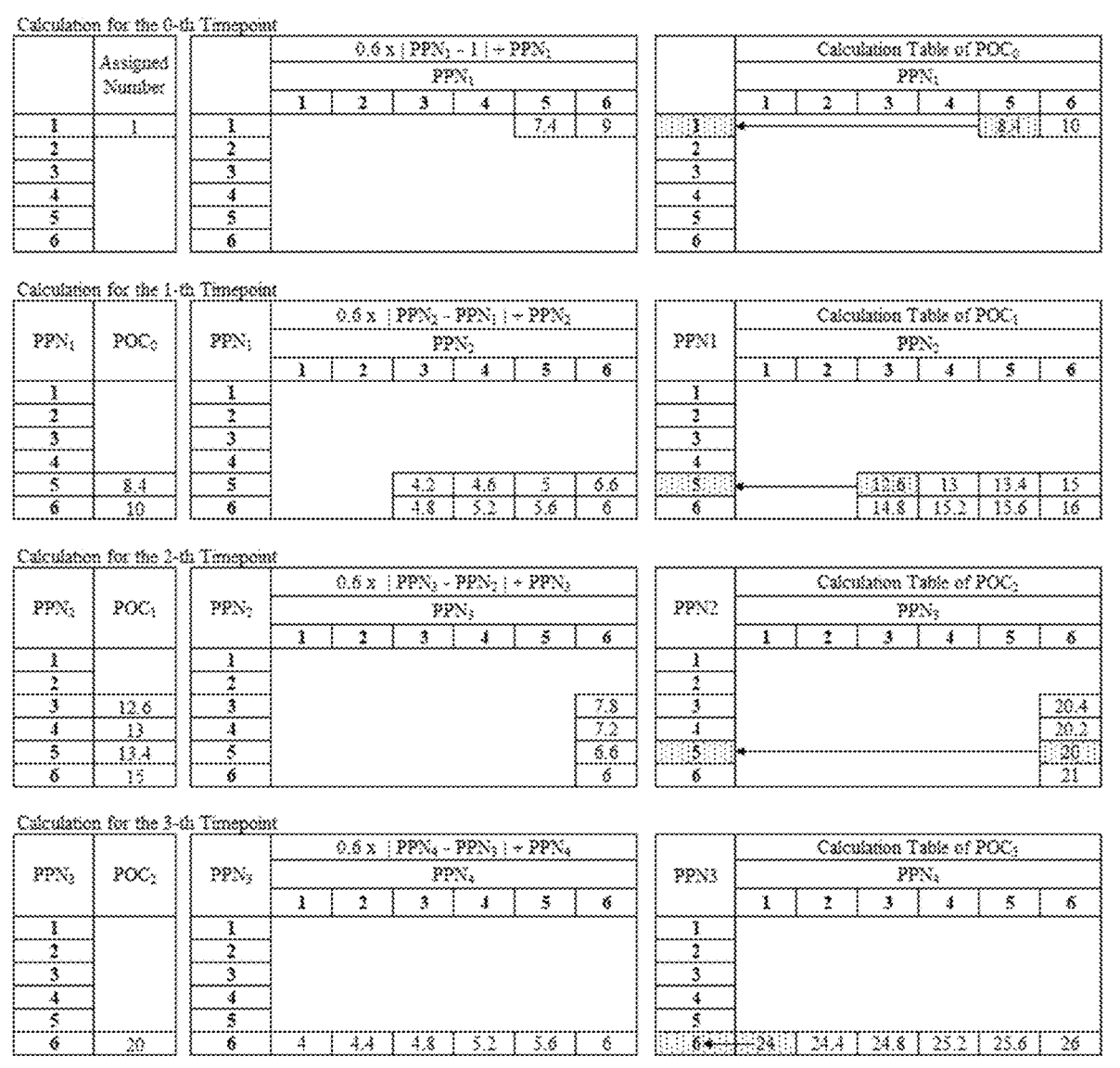

A first sub-step is calculating at least one i-th possible operation cost ($POC_i$), wherein the POC is given by $POC_i = POC_{(i+1)} + RF \times | PPN_{(i+1)} - PPN_i | + PPN_{(i+1)}$, where $POC_{(i-1)}$ is the possible operation cost(s) calculated for the (i−1)-th timepoint, $PPN_{(i+1)}$ is the PPN at the (i+1)-th timepoint ranging from $U_{(i+1)}$ to M, $PPN_i$ is the PPN at the i-th timepoint ranging from $U_i$ to M, and $PPN_i$s used for calculating $POC_i$ and $POC_{(i-1)}$ have the same value (S03-1). Take the calculation for the 1-th timepoint for example. In FIG. 5, the two $POC_0$s are used as the "$POC_{(i-1)}$" in the above calculation formula of the first sub-step. Here, $PPN_{(i+1)}$ is $PPN_2$ and includes 3, 4, 5, and 6. $PPN_i$ is $PPN_1$ and includes 5 and 6 as illustrated above. In order to simply the operation of "$RF \times | PPN_{(i+1)} - PPN_i |$", calculations considering both $U_i$ and $U_{(i+1)}$ from 1 to 6 and M keeping 6 for both $PPN_{(i+1)}$ and $PPN_i$ with RF equal to 0.6 are shown in the look-up table in FIG. 4. Since the right matrix only adds the PPN to each of the transition cost on the same row, 8.4 will be added to 4.2, 4.6, 5 and 6.6 but not added to 4.8, 5.2, 5.6, and 6. Therefore, a row of $POC_1$s ($POC_i$s) obtained are 12.6, 13, 13.4, and 15. Similarly, 10 will be added to 4.8, 5.2, 5.6, and 6 but not added to 4.2, 4.6, 5 and 6.6. Another row of $POC_1$s obtained are 14.8, 15.2, 15.6, and 16. "5" in the $PPN_1$s is used for calculating "8.4" in the $POC_0$s as well as for 12.6, 13, 13.4, and 15 in the $POC_1$s.

A second sub-step is finding out the smallest and the second smallest $POC_i$(S03-2). In FIG. 5, the smallest and the second smallest $POC_1$ are 12.6 and 13, respectively. They are all from the same $PPN_1$ but different in $PPN_2$.

A third sub-step is if the smallest and the second smallest $POC_i$ are calculated from the same $PPN_i$, then setting the $PPN_i$ used to calculate the smallest $POC_i$ as an i-th assigned number, and removing the $POC_i$(s) not calculated from the i-th assigned number for the calculation of next timepoint (S03-3). As illustrated above, the smallest and the second smallest $POC_1$ come from the same $PPN_1$ so that the premise is satisfied, the $PPN_1$ used to calculate the smallest $POC_i$, 12.6 highlighted with dot background, is 5 (also highlighted with dot background and linked to 12.6 by an arrow) and assigned as a 1-th assigned number. $POC_1$s not calculated from the 1-th assigned number 5, namely, 14.8, 15.2, 15.6, and 16 are removed for the calculation of next timepoint. Only 12.6, 13, 13.4, and 15 are left for the 2-th timepoint. The same calculations are provided in FIG. 5 to FIG. 7.

It should be emphasized that the calculations from the step S01 to S03 is only for resource allocation when the 1-th timepoint comes, nothing is deployed at this moment. The calculations are ready before the 1-th timepoint, even before the 0-th timepoint.

The last step of the method is provisioning 1 unit of the resource at the 0-th timepoint and i-th assigned number of units of the resource at the i-th timepoint for the workload by the processor (S04). This step is a step of resource allocation. According to the related data calculated in the previous steps, the numbers of units of the resource are 5, 5, 6, 5, 5, 5, 5, 5, and 6 for the 1-th timepoint to the 9-th timepoint, respectively. The result is different from the prediction which asks 5, 2, 6, 1, 5, 5, 6, 5, 2, and 9 for the 1-th timepoint to the 9-th timepoint, respectively. The provisioned number of units of the resource lead to the lowest cost for operation.

Although the same calculations are carried on for the 2-th timepoint to the 9-th timepoint, there are two exceptions occurred under different situations.

Figure 6:
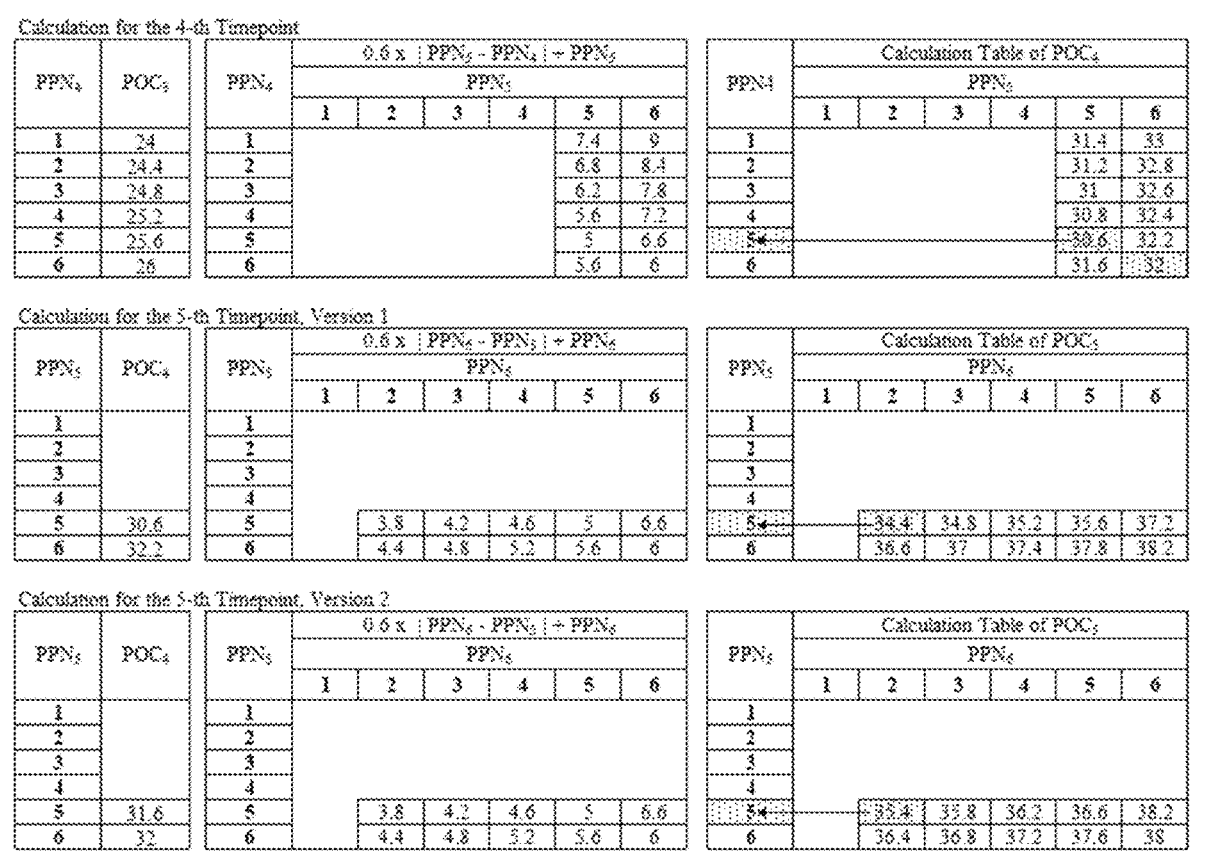

A first exception is illustrated with FIG. 6. The premise of the third sub-step asks the smallest and the second smallest $POC_i$s should be calculated from the same $PPN_i$. However, when processing calculation for the 4-th timepoint, the smallest and the second smallest $POC_4$ are calculated from different $PPN_4$s. Namely, the smallest $POC_4$, 30.6, is calculated from 5 while the second smallest $POC_4$, 32, is calculated from 6. It means it is hard to know which $PPN_4$ leads to the lowest cost in calculations for the 5-th timepoint. According to the present invention, a solution to this situation is to use both $PPN_4$s in individual calculation for the 5-th timepoint and determine the 4-th assigned number according to the results from both calculations. Therefore, a fourth sub-step is required and it is if the smallest and the second smallest $POC_i$ are not calculated from the same $PPN_i$, then individually using the $PPN_i$s to calculate $POC_{(i+1)}$, setting the $PPN_i$ used to calculate the smallest $POC_{(i+1)}$ as the i-th assigned number, and removing the $POC_i$(s) not calculated from the i-th assigned number for the calculation of next timepoint, wherein $POC_{(i+1)}$ is the possible operation cost(s) calculated for the (i+1)-th timepoint (S03-4). In the example in FIG. 6, 5 in the $PPN_4$s and the related $POC_4$s, 30.6 and 32.2 are used in the calculation for the 5-th timepoint, version 1, and 6 in the $PPN_4$s and the related $POC_4$s, 32.2 and 32 are used in the calculation for the 5-th timepoint, version 2. Under this situation, both versions show that 5 is the $PPN_4$ calculating the smallest $POC_5$ (34.4 and 35.4). 5 is then set back for the 4-th assigned number. The rest are the same as that in the third sub-step and not repeat again.

A second exception is encountered in the calculation for the 9-th timepoint. Because only the predictions on 9 timepoints are accepted by the method, even the prediction on the 10-th timepoint is available, it will not be used. Therefore, $PPN_{10}$ is set to be "0". The calculation is shown in FIG. 7.

Figure 7:
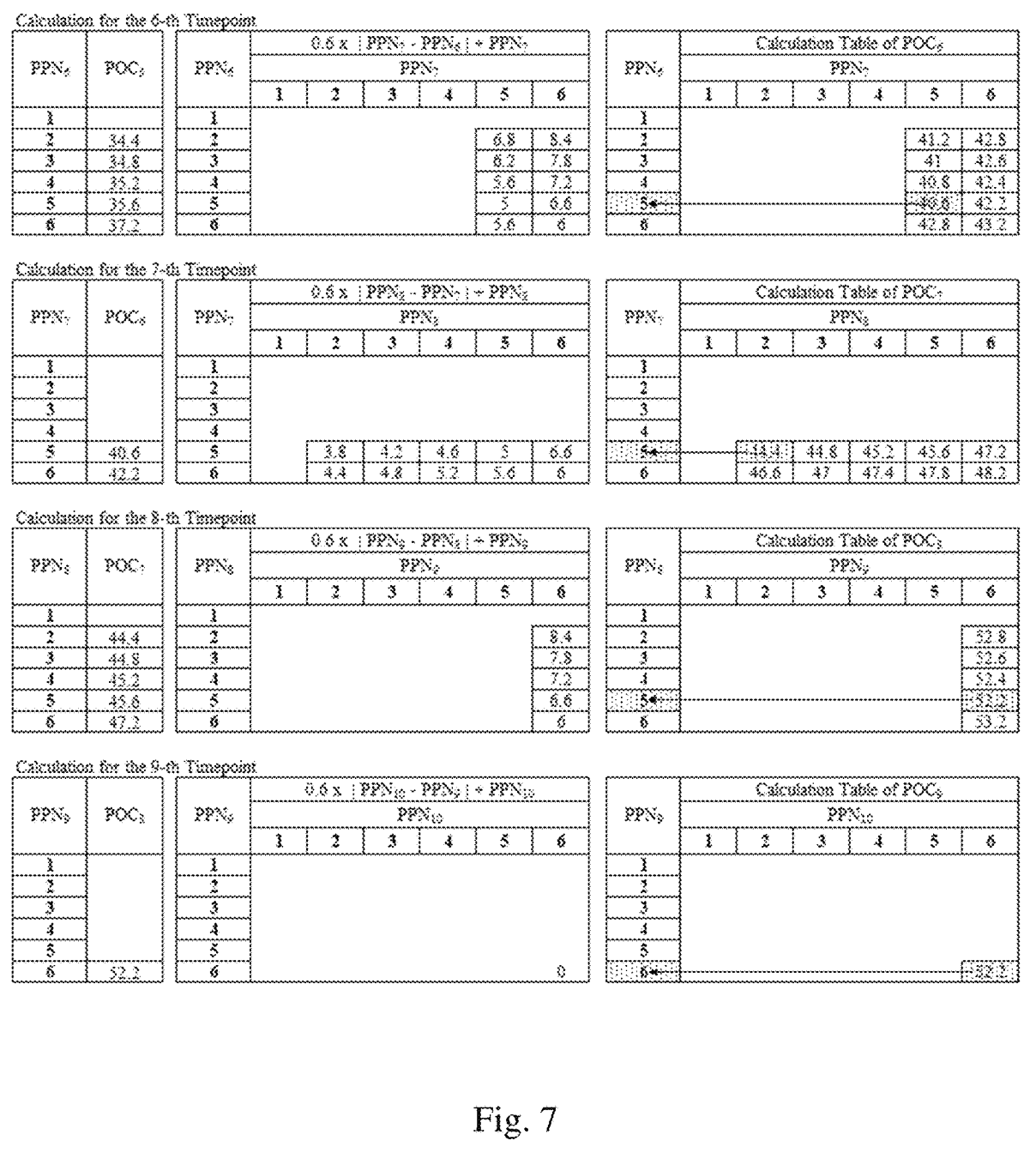

From a traditional reinforcement learning approach point of view, all the data in the right matrixes in FIG. 5 to FIG. 7 should be calculated in case any change to find the smallest costs will not lose. For example, the right matrix in calculation for the 1-th timepoint only includes 8 data while it should take 36 calculations to get 36 data. For this timepoint, 28 calculations are saved; the entire process, from the 0-th timepoint to the 9-th timepoint, 257 calculations are saved; for a real scene that there are thousands of units of the resource and hundreds of timepoints; millions of calculations can be saved. With the help of the method, exponential complexity can be reduced. Near optimum and acceptable results within the limited time can be achieved, expecting to greatly increase availability and reduce operation costs.

According to the spirit of the present invention, the amount of calculations can be further reduced in another modified method. The modified method is illustrated in a second embodiment.

Please refer to FIG. 8. It is a flow chart of the improved method disclosed in the second embodiment of the present invention. In order to simplify the description of the second embodiment, the prediction of resource requirement in the first embodiment is still applied here. In addition, the second embodiment is also applicable to the architecture in FIG. 1. The maximum units of the source available for provisioning, M, keeps 6. The only difference between the method in the first embodiment and the improved method is the definition of PPN. The amount of PPN used for each timepoint used in this embodiment is further reduced. PPN includes the number of units needed at the i-th timepoint, $U_i$, and some other larger numbers. The larger numbers may not include M. The improved method will be illustrated with FIG. 10 and FIG. 11 which tabularize calculations for all timepoints.

A first step of the improved method is providing a prediction on the number of units of the resource needed for a workload in more than N timepoints after a 0-th timepoint to the processor, wherein there are maximum M units of the source available for provisioning and $U_i$ is the number of units needed at the i-th timepoint according to the prediction, and N, M and i are positive integer (S11). This step is the same as the step S01. As mentioned above, N and M keep the same for illustration of the second embodiment.

Figure 9:
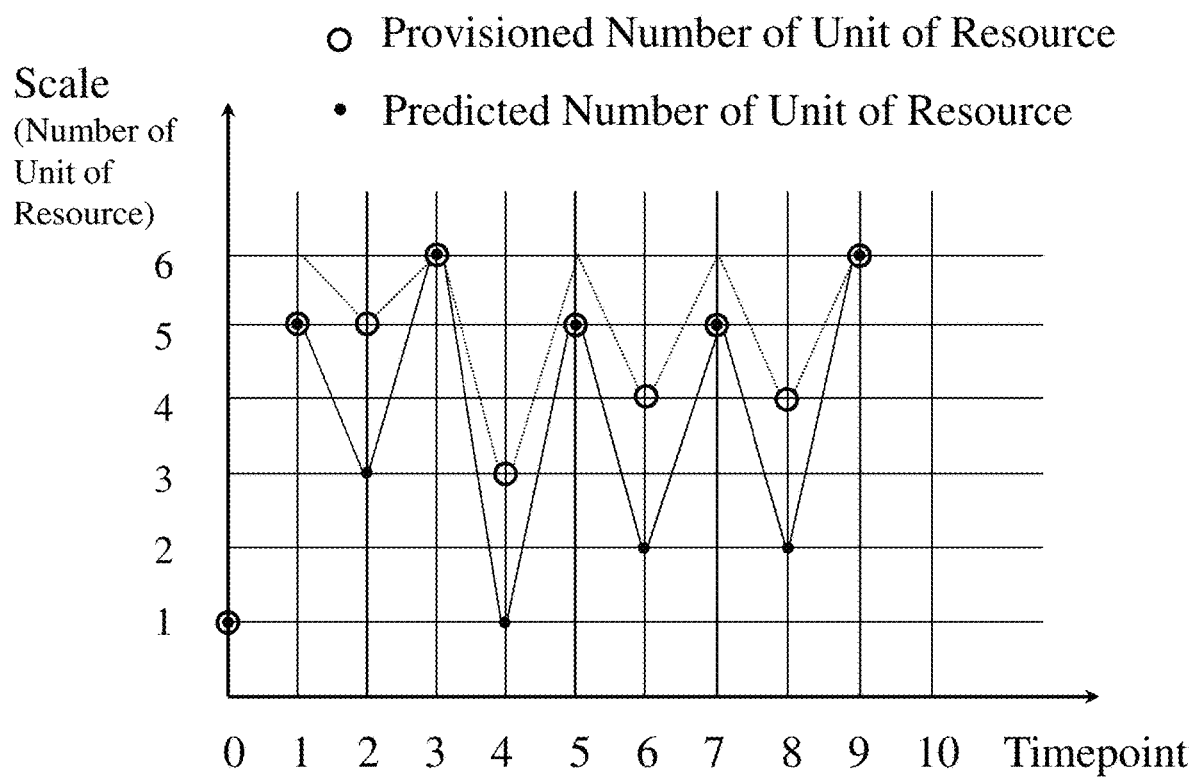
FIG. 9 shows the same prediction result as FIG. 3 with different possible provisioned numbers.

A second step of the improved method is calculating at least one 0-th possible operation cost ($POC_0$) based on at least one possible provisioned number (PPN) at 1-th timepoint ($PPN_1$) ranging from $U_1$ to the smallest of $U_1+A$ and M by the processor, wherein the $POC_0$ is given by $POC_0=K+RF\times |PPN_1-K|+PPN_1$, where RF is a rebalance factor between 0 and 1, and A is an integer (S12). K can be any real number. 1 is used here for example. RF is also set as 0.6. The difference between the step S02 and step S12 is $PPN_1$ is restricted by its upper limit. In order to have a better understanding of the difference, please refer to FIG. 9. It is like FIG. 3, having the same prediction result but different in possible provisioned numbers. In this embodiment, A is 2. For the calculation for each timepoint, a bottom limit is $U_i$ and the upper limit is $U_1+A$ or M whichever is smaller. For the calculation for the 0-th timepoint, $U_1+A$ equals to 7 and M is 6. Therefore, $PPN_1$ is 6 because there are most 6 units of the resource for deployment. It can't be 7. Since 1 is given to be the smallest cost in the beginning, the calculation result of $POC_0$s for the 0-th timepoint are also 8.4 and 10. Please come back to FIG. 7. If the upper limits of $PPN_i$s are connected by dot lines and the lower limits of $PPN_i$s are connected by solid lines for each i-th timepoint, it shapes a "tunnel." The assigned numbers of units of the resource for all timepoints fall in the tunnel.

A third step of the improved method is repeating the following sub-steps for the i-th timepoint with i from 1 to N in sequence by the processor (S13). It seems to be the same as the step S03. However, the sub-steps are different. Below are the descriptions for these sub-steps.

A first sub-step is calculating at least one i-th possible operation cost ($POC_i$), wherein the $POC_i$ is given by $POC_i=POC_{(i-1)}+RF\times | PPN_{(i+1)}-PPN_i|+PPN_{(i+1)}$, where $POC_{(i-1)}$ is the possible operation cost(s) calculated for the (i−1)-th timepoint, $PPN_{(i+1)}$ is the PPN at the (i+1)-th timepoint ranging from $U_{(i+1)}$ to the smallest of $U_{(i+1)}+A$ and M, $PPN_i$ is the PPN at the i-th timepoint ranging from $U_i$ to the smallest of $U_1+A$ and M, and $PPN_i$s used for calculating $POC_i$ and $POC_{(i-1)}$ have the same value (S13-1). Obviously, upper limits of the $PPN_{(i+1)}$ and $PPN_i$ have been changed. For the calculation for the 1-th timepoint, $PPN_2$ includes 3, 4, and 5. $U_2$ is 3 according to the prediction. 6 is no more be used since the minimum of $U_2+2$ and 6 is $U_2+2$ (5).

Similarly, 3_PPN only includes 6. $PPN_4$ includes 1, 2, and 3. $PPN_5$ includes 5 and 6. $PPN_6$ includes 2, 3, and 4. $PPN_7$ includes 5 and 6. $PPN_8$ includes 2, 3, and 4. $PPN_9$ includes 6. Since PPN has the different definition, calculation results of $POC_i$ vary accordingly. For example, in the calculation for the 1-th timepoint, 8.4 is added to 4.2, 4.6, and 5 but not added to 4.8, 5.2, and 5.6. Therefore, a row of $POC_1s$ ($POC_is$) obtained are 12.6, 13, and 13.4. Similarly, 10 will be added to 4.8, 5.2, and 5.6 but not added to 4.2, 4.6, and 5. Another row of $POC_1s$ obtained are 14.8, 15.2, and 15.6. "5" in the $PPN_1s$ is used for calculating "8.4" in the $POC_0s$ as well as for 12.6, 13, and 13.4 in the $POC_1s$.

Figure 10:
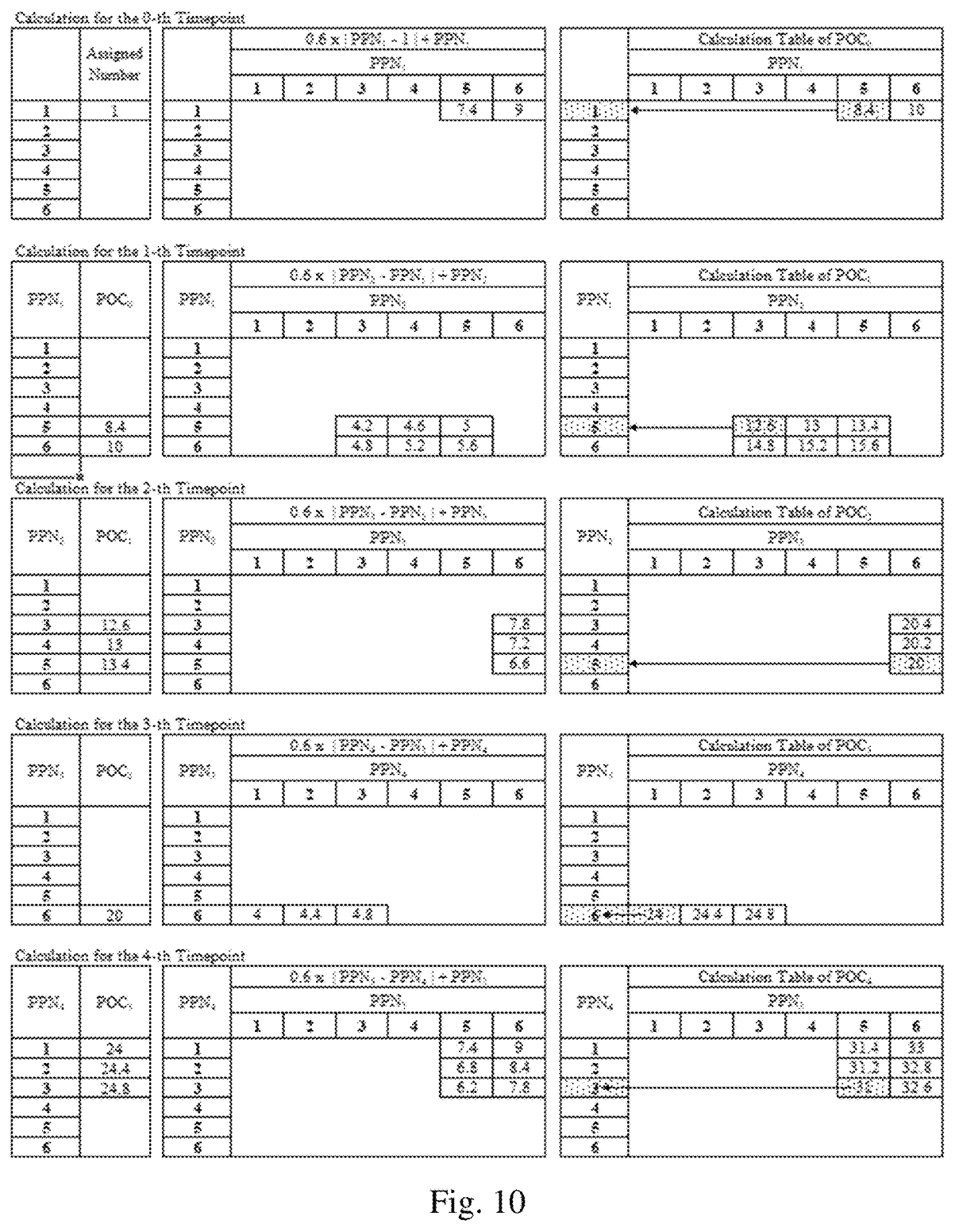

A second sub-step is finding out the smallest and the second smallest $POC_i$(S13-2). This step is the same as the sub-step S03-2. In FIG. 10, the smallest and the second smallest $POC_1$ are 12.6 and 13, respectively. They are all from the same $PPN_1$ but different in $PPN_2$.

A third sub-step is if the smallest and the second smallest $POC_i$ are calculated from the same $PPN_i$, then setting the $PPN_i$ used to calculate the smallest $POC_i$ as an i-th assigned number, and removing the $POC_i(s)$ not calculated from the i-th assigned number for the calculation of next timepoint (S13-3). This step is the same as the sub-step S03-3. Since the second steps and first sub-steps in two methods are different, subsequent results are also different. For example, with the same prediction, the 4-th assigned number in the second embodiment is 3 while the 4-th assigned number in the first embodiment is 5.

Similarly, the last step of the improved method is provisioning 1 unit of the resource at the 0-th timepoint and i-th assigned number of units of the resource at the i-th timepoint for the workload by the processor (S14). It is the same as the step S04 and will not be described in detail again.

Like the first embodiment, the improved method might meet two kinds of exceptions. In the second embodiment, the first exception is not seen. However, it might appear in some other examples. Under this situation, below sub-step works: if the smallest and the second smallest $POC_i$ are not calculated from the same $PPN_i$, then individually using the $PPN_js$ to calculate $POC_{(i-1)}$, setting the $PPN_i$ used to calculate the smallest $POC_{(i+1)}$ as the i-th assigned number, and removing the $POC_i(s)$ not calculated from the i-th assigned number for the calculation of next timepoint, wherein $POC_{(i+1)}$ is the possible operation cost(s) calculated for the (i+1)-th timepoint (S13-4).

Figure 11:
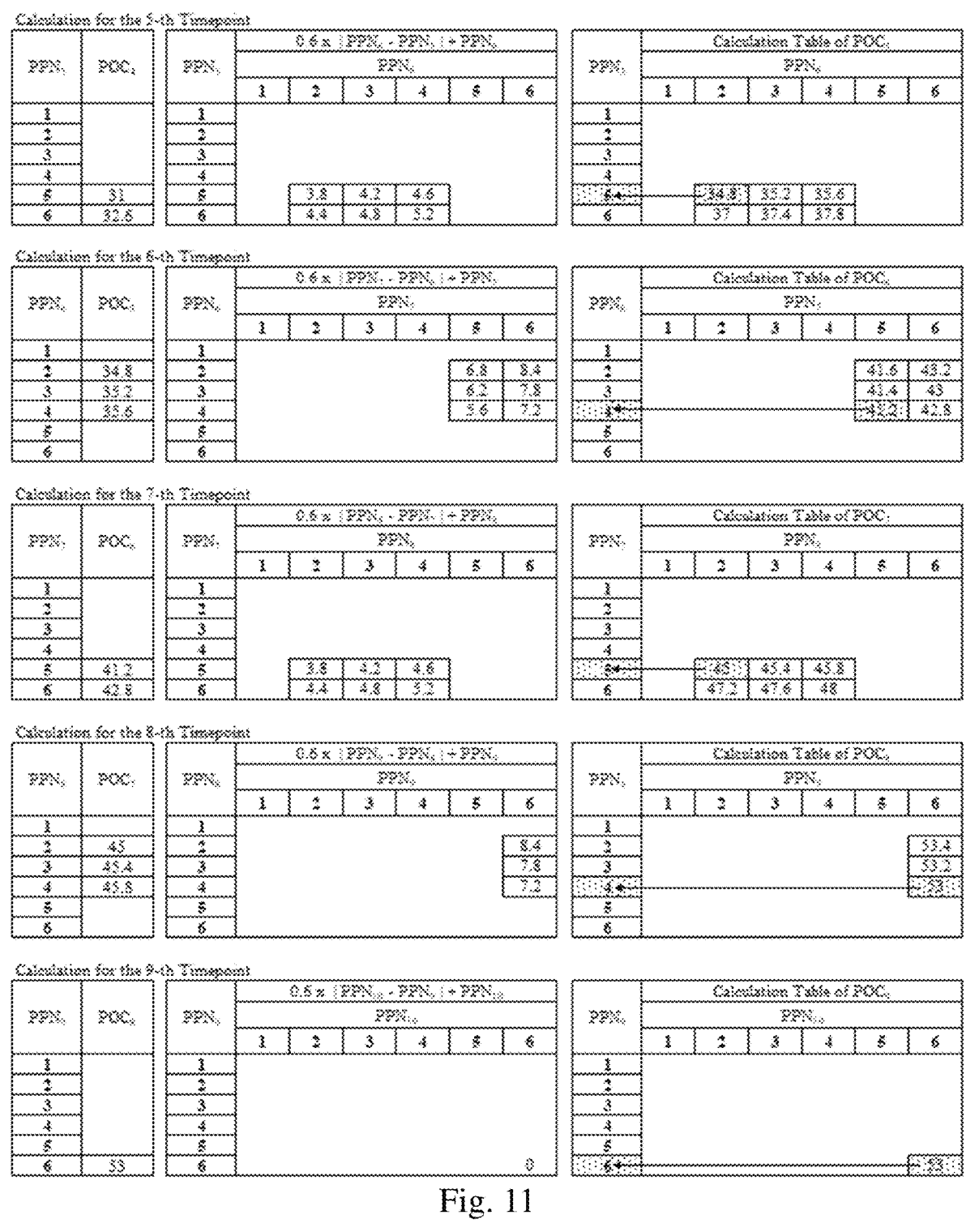

The second exception is also encountered in the calculation for the 9-th timepoint in the second embodiment. The same means in the first embodiment is used to deal with $PPN_{10}$ here. $PPN_{10}$ is set to be "0". The calculation is shown in FIG. 11.

The total number of calculations in the method in the first embodiment is 67 (regardless of the calculation for the 5-th timepoint, version 2 which doesn't happen in the second embodiment) while that in the improved method in the second embodiment is 41. Comparing with the first embodiment, the improved method in the second embodiment has less calculations. 26 calculations are saved. Although the provisioned numbers of the resource at each timepoint are not the same, there is no significant difference between them and they both work for the same prediction.

In the aforementioned embodiments, one assigned number is obtained from calculations for two timepoints. According to the present invention, more than one assigned number can be obtained from calculations for two timepoints. From another point of view, the previous embodiments collect data for determining provisioned resource with one "window" between two timepoints. More windows can be applied to collect data. The number of calculations may increase, but time can be saved. Another method for optimizing resource allocation based on prediction with reinforcement learning is illustrated in a third embodiment.

Please refer to FIG. 12. It is a flow chart of a method disclosed in a third embodiment of the present invention. In this embodiment, the prediction of resource requirement in the previous embodiments is still applied here. Similarly, the third embodiment is also applicable to the architecture in FIG. 1. The maximum units of the source available for provisioning, M, keeps 6. The method will be illustrated with FIG. 15 to FIG. 19 which tabularize calculations for all timepoints.

A first step of the method is providing a prediction on the number of units of the resource needed for a workload in more than N timepoints after a 0-th timepoint to the processor, wherein there are maximum M units of the source available for provisioning and $U_i$ is the number of units needed at the i-th timepoint according to the prediction, and N, M and i are positive integer (S21). This step is the same as the step S01 and S11. As mentioned above, N and M keep the same for illustration of the present embodiment.

Figure 13:
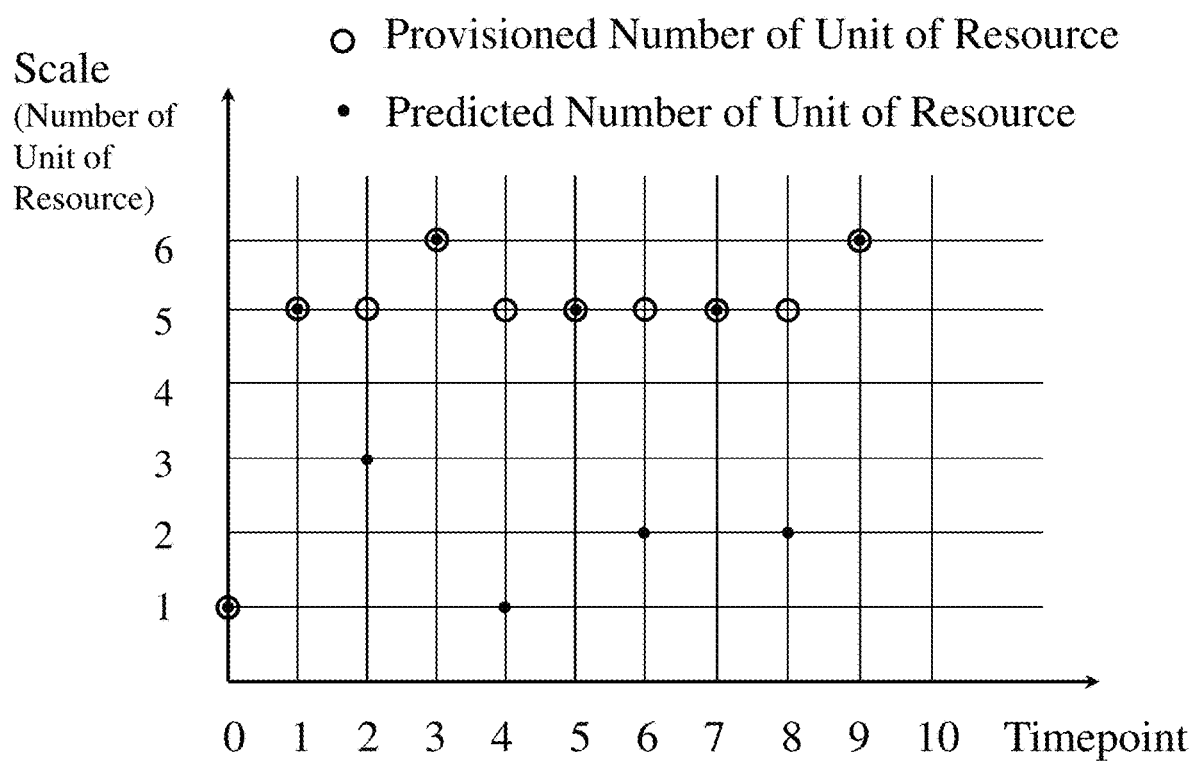
FIG. 13 shows a prediction result.
Figure 15:
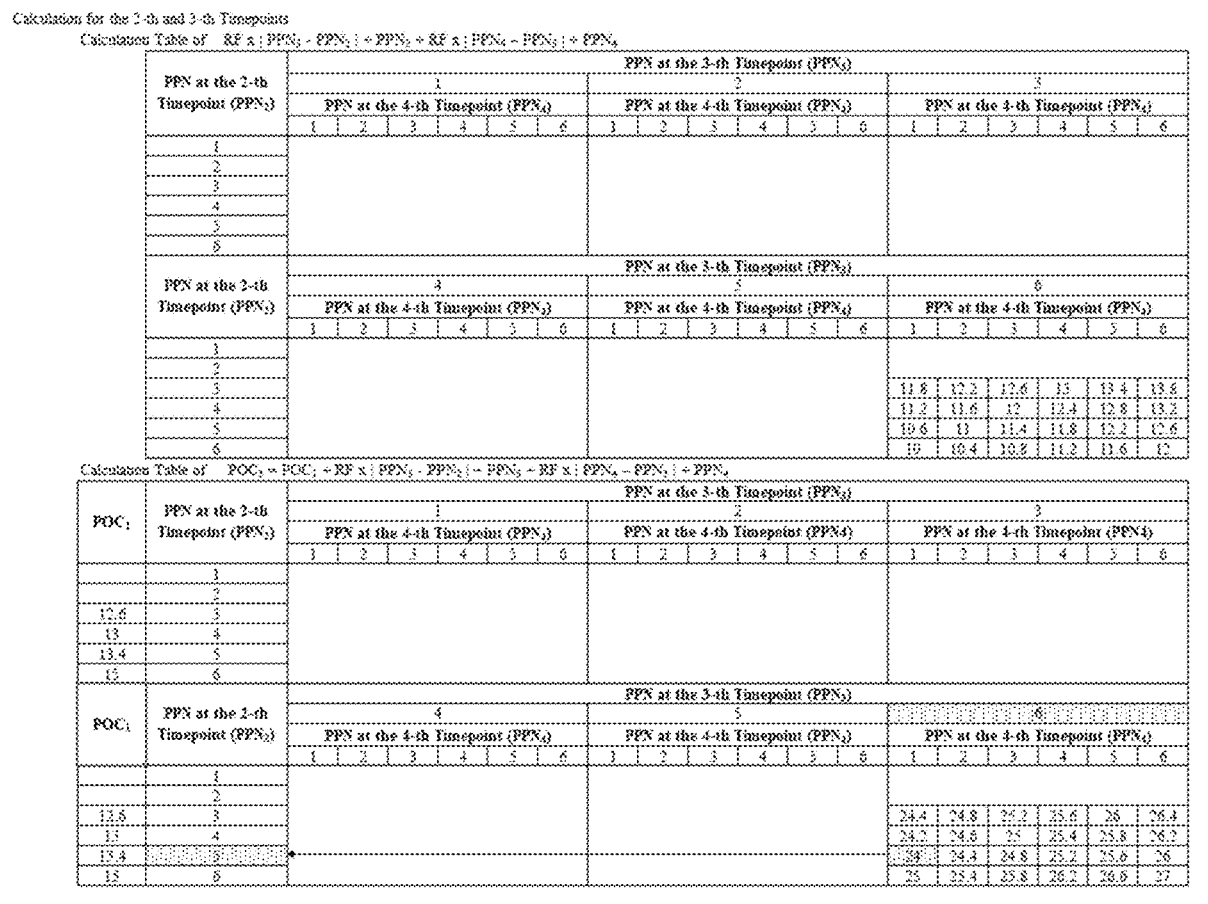

A second step of the method is calculating at least one 1-th possible operation cost ($POC_1$) based on at least one possible provisioned number (PPN) at 1-th timepoint ($PPN_1$) ranging from $U_1$ to M and at least one PPN at 2-th timepoint ($PPN_2$) ranging from $U_2$ to M by the processor, wherein the $POC_0$ is given by $POC_1 = K + RF \times |PPN_1 - K| + PPN_1 + RF \times |PPN_2 - PPN_1| + PPN_2$, where RF is a rebalance factor between 0 and 1, and K is a real number (S22). RF is also set as 0.6. K is 1. In order to have a better understanding of the difference, please refer to FIG. 13 and FIG. 15. FIG. 13 has the same prediction result as FIG. 3. FIG. 14 includes two tables for calculations. The upper table lists all calculations for $RF \times |PPN_1 - 1| + PPN_1 + RF \times |PPN_2 - PPN_1| + PPN_2$ while the bottom table shows all calculations for $POC_1 = 1 + RF \times |PPN_1 - 1| + PPN_1 + RF \times |PPN_2 - PPN_1| + PPN_2$. "1" (not the one in $PPN_1$ and $POC_1$) is the assigned number in the bottom table. It is to set the initial operation cost as only one resource is provisioned. It is clear that the formula to calculate $POC_1$ is similar to the formula to obtain $POC_i$ but process calculations across three timepoints (two windows).

A third step of the method is setting the $PPN_1$ used to calculate the smallest $POC_1$ as a 1-th assigned number (S23). The function of the assigned number is the same as that in the first embodiment. Since $POC_1$ is the smallest, it means $PPN_1$ can lead the result and is chosen as the 1-th assigned number.

A fourth step of the method is repeating the following sub-steps for timepoints with an even number i from 2 to $2 \times [N/2]$ in sequence by the processor (S24). The definition of "i" is different from that in the previous embodiments. First, "i" is an even number, e.g., 2, 4, 6, . . . , etc. [N/2] is the calculation under Gaussian notation. In this embodiment, N is 9 so that [N/2] is 8. Namely, 2, 4, 6, and 8 are taken as "i" for calculations in different iterations. Below are the descriptions for these sub-steps.

A first sub-step is calculating at least one (i+1)-th possible operation cost $POC_{(i+1)}$, wherein the $POC_{(i+1)}$ is given by $POC_{(i+1)} = POC_{(i-1)} + RF \times |PPN_{(i+1)} - PPN_i| + PPN_{(i+1)} + Wi$, where Wi is $RF \times |PPN_{(i+2)} - PPN_{(i+1)}| + PPN_{(i+2)}$, $POC_{(i-1)}$ is the possible operation cost(s) calculated for the (i−1)-th timepoint, $PPN_{(i+2)}$ is the PPN at the (i+2)-th timepoint ranging from U(i+2) to M, $PPN_{(i+1)}$ is the PPN at the (i+1)-th timepoint ranging from U(i+1) to M, $PPN_i$ is the PPN at the i-th timepoint ranging from Ui to M, and $PPN_is$ used for calculating $POC_{(i+1)}$ and $POC_{(i-1)}$ have the same value;

wherein if (i+2) is greater than N, Wi is omitted from calculation (S24-1). For convenience, the results of $POC_{(i+1)}=POC_{(i-1)}+RF\times|PPN_{(i+1)}-PPN_i|+PPN_{(i+1)}+RF\times|PPN_{(i+2)}-PPN_{(i+1)}|+PPN_{(i+2)}$, (i−1) with RF=0.6 are given in FIG. 14. Take i=2 for example. Please see FIG. 16. FIG. 16 tabularizes calculations for all timepoints. Here, $POC_3$s are calculated from $POC_1$s. From FIG. 15, $POC_1$s are 12.6, 13, 13.4 and 15. The formula becomes $POC_3=POC_1+RF\times|PPN_3-PPN_2|+PPN_3+RF\times|PPN_4-PPN_3|+PPN_4$. The upper table shows the results of $RF\times|PPN_3-PPN_2|+PPN_3+RF\times|PPN_4-PPN_3|+PPN_4$. In FIG. 16, $PPN_2$ ranges from 3 to 6, $PPN_3$ is only 6 and $PPN_4$ ranges from 1 to 6. Thus, only 24 numbers are calculated and shown in the upper table. The results of $POC_3$s are available on the right bottom in the bottom table.

A second sub-step is finding out the smallest and the second smallest $POC_i$(S24-2). This step is the same as the sub-steps S03-2 and S13-2. In FIG. 16, the smallest and the second smallest $POC_3$ are 24 and 24.2, respectively. They are from different $PPN_2$s.

Figure 17:
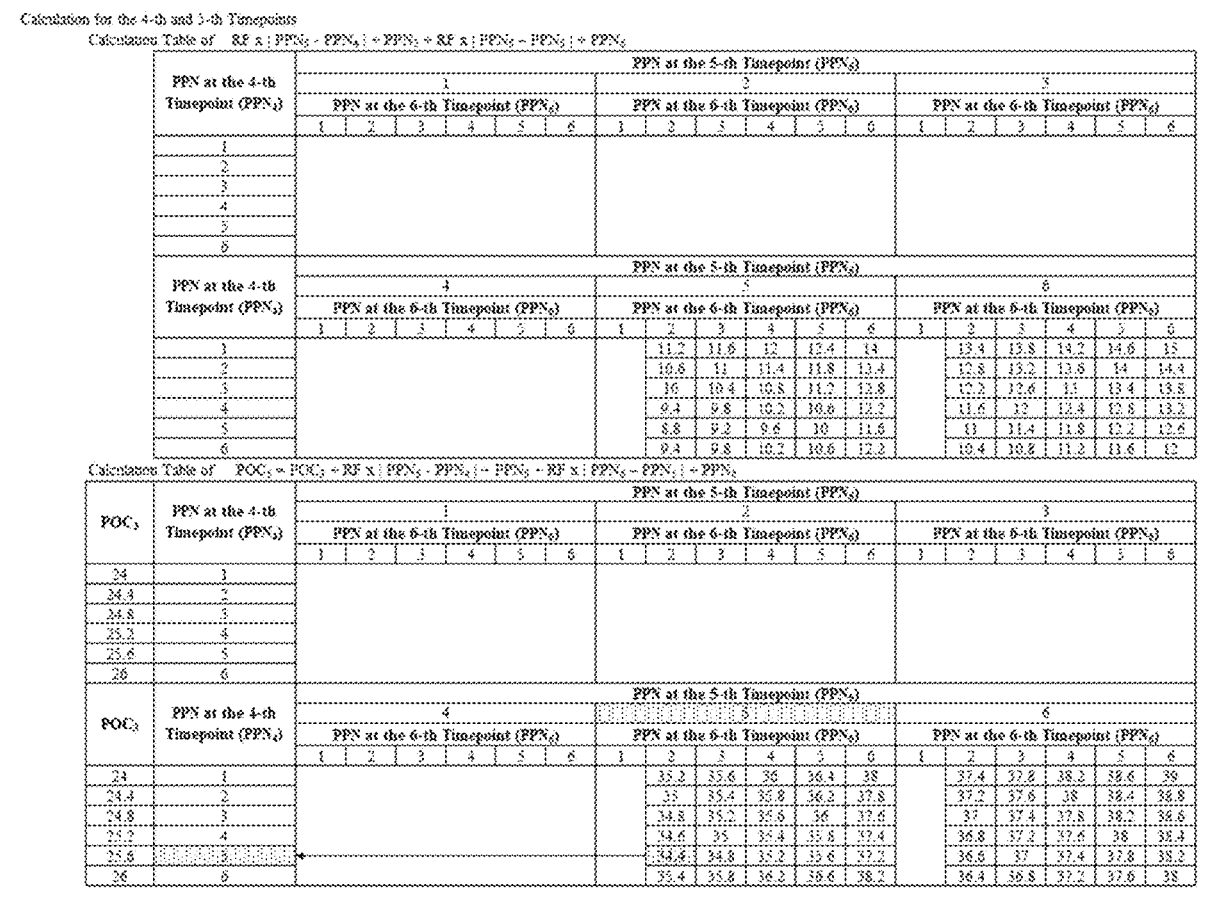
Figure 18:
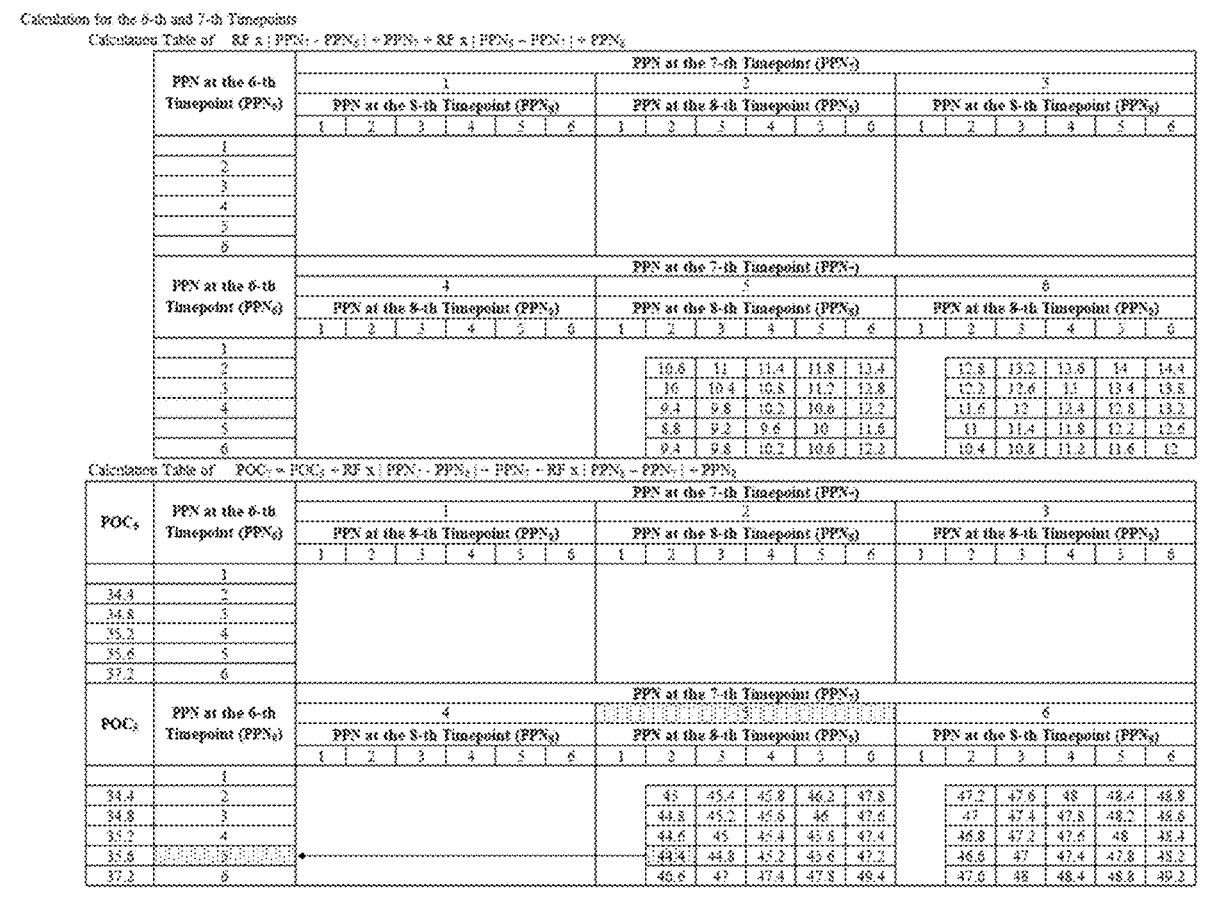

A third sub-step is if the smallest and the second smallest $POC_i$ are calculated from the same $PPN_i$, then setting the $PPN_i$ used to calculate the smallest $POC_{(i+1)}$ as an i-th assigned number and the $PPN_{(i+1)}$ used to calculate the smallest $POC_{(i+1)}$ as an (i+1)-th assigned number, and removing the $POC_{(i+1)}$(s) not calculated from the i-th assigned number for the calculation of next timepoint (S24-3). In this embodiment, although the smallest and the second smallest $POC_3$ are calculated from the same $PPN_2$, the $PPN_2$ used can be found by the same process in the second embodiment. It is omitted here and will not be repeated. 24 is the $PPN_2$ (highlighted with dot background). Thus, the 2-th assigned number is 5 and the 3-th assigned number is 6 (highlighted with dot background). $POC_3$s used for the calculations for the next iteration are 24, 24.4, 24.8, 25.2, 25.6 and 26. The calculation results for i=4 and i=6 are shown in FIG. 17 and FIG. 18.

Different calculations happen when i is 8. There is no $PPN_{10}$. It matches the condition that (i+2) is greater than N (10>9). The part of Wi is omitted from calculation. The calculation results are shown in FIG. 19. A simplified formula becomes $POC_9=POC_7+RF\times|PPN_9-PPN_8|+PPN_9$. The type of the formula is the same as that in the previous embodiments. However, the 8_th and 9_th assigned numbers are chosen according to the same method above. The 8_th assigned number is 5 and the 9_th assigned number is 6.

The last step of the method is provisioning 1 unit of the resource at the 0-th timepoint and j-th assigned number of units of the resource at the j-th timepoint for the workload by the processor where j ranges from 1 to N (S25). It is the same to the step S04 and S14 while the notation of variable is different.

The total number of calculations in the method in the third embodiment is 137. Comparing with the first and second embodiments, the method in the third embodiment uses more calculations. Although the provisioned numbers of the resource at each timepoint may not the same, but not far away, time to have the results can be reduced.

It should be emphasized that all the mathematical formulas above are used only for illustrations, not to restrict the application of the present invention. Any other mathematical formulas which can express the same calculus logic are also in the scope of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for optimizing resource allocation in a computer cluster based on prediction with reinforcement learning, implemented by a processor, comprising the steps of:
   a) providing a prediction on the number of units of a hardware resource needed for a workload in more than N timepoints after a 0-th timepoint to the processor, wherein there are maximum M units of the source available for provisioning and $U_i$ is the number of units needed at the i-th timepoint according to the prediction, and N, M and i are positive integer;
   b) calculating at least one 0-th possible operation cost ($POC_0$) based on at least one possible provisioned number (PPN) at a 1-th timepoint ($PPN_1$) ranging from $U_1$ to M by the processor, wherein the $POC_0$ is given by $POC_0=K+RF\times|PPN_1-K|+PPN_1$, where RF is a rebalance factor between 0 and 1, and K is a real number;
   c) for each i-th timepoint with i from 1 to N:
      c1) calculating at least one i-th possible operation cost ($POC_i$), wherein the $POC_i$ is given by $POC_i=POC_{(i-1)}+RF\times|PPN_{(i+1)}-PPN_i|+PPN_{(i+1)}$, where $POC_{(i-1)}$ is the possible operation cost(s) calculated for the (i−1)-th timepoint, $PPN_{(i+1)}$ is the PPN at the (i+1)-th timepoint ranging from $U_{(i+1)}$ to M, $PPN_i$ is the PPN at the i-th timepoint ranging from $U_i$ to M, and $PPN_i$s used for calculating $POC_i$ and $POC_{(i-1)}$ have the same value;
      c2) identifying the smallest and the second smallest $POC_i$ to efficiently prune search space and reduce computational complexity; and
      c3) if the smallest and the second smallest $POC_i$ are calculated from the same $PPN_i$, then setting the $PPN_i$ used to calculate the smallest $POC_i$ as an i-th assigned number, and removing the $POC_i$(s) not calculated from the i-th assigned number for the calculation of next timepoint, thereby further reducing computational burden; and
   d) provisioning an i-th assigned number of units of the hardware resource at the i-th timepoint for the workload by the processor to dynamically adjust resource allocation within the computer cluster.

2. The method according to claim 1, further comprising a sub-step: c4) if the smallest and the second smallest $POC_i$ are not calculated from the same $PPN_i$, then individually using the $PPN_i$s to calculate $POC_{(i+1)}$, setting the $PPN_i$ used to calculate the smallest $POC_{(i+1)}$ as the i-th assigned number, and removing the $POC_i$(s) not calculated from the i-th assigned number for the calculation of next timepoint, wherein $POC_{(i+1)}$ is the possible operation cost(s) calculated for the (i+1)-th timepoint.

3. The method according to claim 1, wherein the hardware resource is memory module, CPU, I/O throughput, response time, request per second, or latency.

4. A method for optimizing resource allocation in a computer cluster based on prediction with reinforcement learning, implemented by a processor comprising the steps of:

a) providing a prediction on the number of units of a hardware resource needed for a workload in more than N timepoints after a 0-th timepoint to the processor, wherein there are maximum M units of the source available for provisioning and $U_i$ is the number of units needed at the i-th timepoint according to the prediction, and N, M and i are positive integer;

b) calculating at least one 0-th possible operation cost ($POC_0$) based on at least one possible provisioned number (PPN) at a 1-th timepoint ($PPN_1$) ranging from $U_1$ to the smallest of $U_1+A$ and M by the processor, wherein the $POC_0$ is given by $$POC_0 = K + RF \times |PPN_1 - K| + PPN_1,$$

where RF is a rebalance factor between 0 and 1, A is an integer, and K is a real number;

c) for each i-th timepoint with i from 1 to N:

c1) calculating at least one i-th possible operation cost ($POC_i$), wherein the $POC_i$ is given by $$POC_i = POC_{(i-1)} + RF \times |PPN_{(i+1)} - PPN_i| + PPN_{(i+1)},$$

where $POC_{(i-1)}$ is the possible operation cost(s) calculated for the (i−1)-th timepoint, $PPN_{(i+1)}$ is the PPN at the (i+1)-th timepoint ranging from $U_{(i+1)}$ to the smallest of $U_{(i+1)}+A$ and M, $PPN_i$ is the PPN at the i-th timepoint ranging from $U_i$ to the smallest of $U_i+A$ and M, and $PPN_i$s used for calculating $POC_i$ and $POC_{(i-1)}$ have the same value;

c2) identifying the smallest and the second smallest $POC_i$ to efficiently prune search space and reduce computational complexity; and c3) if the smallest and the second smallest $POC_i$ are calculated from the same $PPN_i$, then setting the $PPN_i$ used to calculate the smallest $POC_i$ as an i-th assigned number, and removing the $POC_i$(s) not calculated from the i-th assigned number for the calculation of next timepoint, thereby further reducing computational burden; and d) provisioning an i-th assigned number of units of the hardware resource at the i-th timepoint for the workload by the processor to dynamically adjust resource allocation within the computer cluster.

5. The method according to claim 4, further comprising a sub-step: c4) if the smallest and the second smallest $POC_i$ are not calculated from the same $PPN_i$, then individually using the $PPN_i$s to calculate $POC_{(i+1)}$, setting the $PPN_i$ used to calculate the smallest $POC_{(i+1)}$ as the i-th assigned number, and removing the $POC_i$(s) not calculated from the i-th assigned number for the calculation of next timepoint, wherein $POC_{(i+1)}$ is the possible operation cost(s) calculated for the (i+1)-th timepoint.

6. The method according to claim 4, wherein the hardware resource is memory module, CPU, I/O throughput, response time, request per second, or latency.

7. A method for optimizing resource allocation in a computer cluster based on prediction with reinforcement learning, implemented by a processor, comprising the steps of:

a) providing a prediction on the number of units of a hardware resource needed for a workload in more than N timepoints after a 0-th timepoint to the processor, wherein there are maximum M units of the source available for provisioning and $U_i$ is the number of units needed at the i-th timepoint according to the prediction, and N, M and i are positive integer;

b) calculating at least one 1-th possible operation cost ($POC_1$) based on at least one possible provisioned number (PPN) at a 1-th timepoint ($PPN_1$) ranging from $U_1$ to M and at least one PPN at 2-th timepoint ($PPN_2$) ranging from $U_2$ to M by the processor, wherein the $POC_0$ is given by $$POC_1 = K + RF \times |PPN_1 - K| + PPN_1 + RF \times |PPN_2 - PPN_1| + PPN_2,$$

where RF is a rebalance factor between 0 and 1, and K is a real number;

c) setting the $PPN_1$ used to calculate the smallest $POC_1$ as a 1-th assigned number;

d) for each timepoints with an even number i from 2 to $2 \times [N/2]$:

d1) calculating at least one (i+1)-th possible operation cost $POC_{(i+1)}$, wherein the $POC_{(i+1)}$ is given by $$POC_{(i+1)} = POC_{(i-1)} + RF \times |PPN_{(i+1)} - PPN_i| + PPN_{(i+1)} + Wi,$$

where Wi is $RF \times |PPN_{(i+2)} - PPN_{(i+1)}| + PPN_{(i+2)}$, $POC_{(i-1)}$ is the possible operation cost(s) calculated for the (i−1)-th timepoint, $PPN_{(i+2)}$ is the PPN at the (i+2)-th timepoint ranging from $U_{(i+2)}$ to M, $PPN_{(i+1)}$ is the PPN at the (i+1)-th timepoint ranging from $U_{(i+1)}$ to M, $PPN_i$ is the PPN at the i-th timepoint ranging from $U_i$ to M, and $PPN_i$s used for calculating $POC_{(i+1)}$ and $POC_{(i-1)}$ have the same value; wherein if (i+2) is greater than N, Wi is omitted from calculation;

d2) identifying the smallest and the second smallest $POC_i$ to efficiently prune search space and reduce computational complexity; and d3) if the smallest and the second smallest $POC_i$ are calculated from the same $PPN_i$, then setting the $PPN_i$ used to calculate the smallest $POC_{(i+1)}$ as an i-th assigned number and the $PPN_{(i+1)}$ used to calculate the smallest $POC_{(i+1)}$ as an (i+1)-th assigned number, and removing the $POC_{(i+1)}$(s) not calculated from the i-th assigned number for the calculation of next timepoint, thereby further reducing computational burden; and e) provisioning a j-th assigned number of units of the hardware resource at the j-th timepoint for the workload by the processor where j ranges from 1 to N to dynamically adjust resource allocation within the computer cluster.

8. The method according to claim 7, wherein the hardware resource is memory module, CPU, I/O throughput, response time, request per second, or latency.

* * * * *